United States Patent
Glory et al.

(10) Patent No.: US 12,244,677 B2
(45) Date of Patent: *Mar. 4, 2025

(54) SYSTEM AND METHOD FOR REMOTELY INTERACTING WITH CLOUD-BASED CLIENT APPLICATIONS

(71) Applicant: Skillz Platform Inc., San Francisco, CA (US)

(72) Inventors: Meidad Glory, San Francisco, CA (US); Aharon Weisberg, Ridgefield, WA (US); Andrew Fead, Portland, OR (US)

(73) Assignee: Skillz Platform Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,583

(22) Filed: Nov. 7, 2023

(65) Prior Publication Data

US 2024/0195885 A1 Jun. 13, 2024

Related U.S. Application Data

(63) Continuation of application No. 18/090,012, filed on Dec. 28, 2022, now Pat. No. 11,848,768.

(Continued)

(51) Int. Cl.
*G06F 15/16* (2006.01)
*G06Q 30/0251* (2023.01)
*H04L 67/141* (2022.01)
(Continued)

(52) U.S. Cl.
CPC ....... *H04L 67/565* (2022.05); *G06Q 30/0261* (2013.01); *H04L 67/141* (2013.01); *H04L 67/143* (2013.01)

(58) Field of Classification Search
CPC ... H04L 67/565; H04L 67/141; H04L 67/143; G06Q 30/0261
(Continued)

(56) References Cited

U.S. PATENT DOCUMENTS 8,037,178 B1 10/2011 Agarwalla et al.
8,645,905 B2 * 2/2014 Halbedel ............... G06F 16/903
        709/203

(Continued)

FOREIGN PATENT DOCUMENTS

CN   108369534 B   3/2022
WO   2023129613 A1  7/2023

*Primary Examiner* — Bharat Barot
(74) *Attorney, Agent, or Firm* — Mintz Levin Cohn Ferris Glovsky and Popeo, P.C.

(57) ABSTRACT

Systems and methods for enabling various devices to remotely interact with cloud-based client applications are provided. A method comprises receiving a first request from a first client device of a user to initiate an interactive session with a cloud-based client application, reserving an application engine for executing the cloud-based client application remotely from the first client device, receiving interaction data from the first client device as the user engages with a first media data associated with the cloud-based client application, modifying the cloud-based client application executing within the application engine that is reserved based on the interaction data received from the first client device, receiving a second request from the first client device to end the interactive session with the cloud-based client application that is modified, and deallocating the application engine that is reserved, wherein the application engine that is reserved is delinked from the first client device.

20 Claims, 7 Drawing Sheets

Related U.S. Application Data

(60) Provisional application No. 63/266,189, filed on Dec. 30, 2021.

(51) Int. Cl.
*H04L 67/143* (2022.01)
*H04L 67/565* (2022.01)

(58) Field of Classification Search
USPC .................................. 709/202–203, 225–228
See application file for complete search history.

(56) References Cited

U.S. PATENT DOCUMENTS

| | | |
|---|---|---|
| 9,652,129 B1 | 5/2017 | Caballero |
| 10,063,430 B2 | 8/2018 | Binyamin et al. |
| 11,848,768 B2* | 12/2023 | Glory .................... H04L 67/565 |
| 2004/0068572 A1 | 4/2004 | Wu |
| 2007/0180122 A1 | 8/2007 | Barrett |
| 2013/0138810 A1 | 5/2013 | Binyamin et al. |
| 2014/0136295 A1* | 5/2014 | Wasser .................... G06Q 30/02 |
| | | 705/7.38 |
| 2016/0191655 A1 | 6/2016 | Yoakum et al. |
| 2017/0223093 A1 | 8/2017 | Peterson et al. |
| 2018/0054480 A1 | 2/2018 | Bailey et al. |
| 2019/0200054 A1 | 6/2019 | Dharmaji |
| 2020/0059539 A1 | 2/2020 | Wang et al. |
| 2021/0397494 A1* | 12/2021 | Graham .................. G06F 9/547 |
| 2022/0291977 A1 | 9/2022 | Piagentini et al. |
| 2022/0365631 A1 | 11/2022 | Yuen et al. |
| 2023/0216933 A1 | 7/2023 | Glory et al. |

* cited by examiner

SYSTEM AND METHOD FOR REMOTELY INTERACTING WITH CLOUD-BASED CLIENT APPLICATIONS

CROSS-REFERENCE TO RELATED APPLICATIONS

This application is a continuation of U.S. patent application Ser. No. 18/090,012, filed Dec. 28, 2022, which claims the benefit of U.S. Provisional Application No. 63/266,189, filed Dec. 30, 2021, the entire contents of which are hereby incorporated by reference herein.

BACKGROUND

The development and distribution of client applications designed to run on mobile devices have increased significantly to support the proliferation of mobile devices. Client applications can provide users with a wide variety of functions and features and access to a plethora of information to satisfy virtually any need or interest. Although client applications offer flexibility and portability to users, client applications can be limited by both the operating system running on the mobile device and mobile device itself. For example, such client applications can only be run in the mobile device operating system for which they are designed. Consequently, users with mobile devices running one particular operating system may not have access to or be able to use client applications designed to run in another mobile device operating system and/or on different mobile device hardware. Those mobile device users also cannot access or use client applications designed to run on entirely different (non-mobile) hardware platforms and operating systems. Additionally, users with mobile devices that do not support the hardware and/or software requirements for natively-installed client applications may not be able to access those client applications without a costly upgrade to the latest mobile device. Client applications are also inherently bound to the mobile device and cannot be run or accessed via other non-mobile devices.

SUMMARY

The present invention is directed to a system and method for remotely interacting with cloud-based client applications. According to the present invention, a client application can be emulated remotely on a server or other cloud-based platform. The video and audio from the cloud-based client application can be streamed in real-time to a browser application running on the client device of a user. The user can interact with the cloud-based client application through the local browser application as if the cloud-based client application was running natively on the client device. Inputs from the user can be transmitted back to the cloud-based client application executing in an application engine to allow the user to control and interact with the cloud-based client application in real-time. The present invention can support interaction with any type of cloud-based client application on any type of client device (e.g., smartphones, tablets, laptops, desktop computers, gaming consoles, and the like) running any type of operating system and independent of the underlying hardware and device characteristics of the client device. Embodiments of the present invention can also support the integration of a cloud-based client application into third-party applications and websites. Such integration can allow those third-party applications and websites to more easily offer different features and functionality via the integrated cloud-based client application that complement and enhance interaction and engagement with the third-party applications and websites.

Systems and methods for enabling various devices to remotely interact with cloud-based client applications are provided. Related apparatus, techniques, and articles are also described.

In an aspect, a first request can be received from a first client device of a user to initiate an interactive session with a cloud-based client application. The cloud-based client application can be configured to execute on a second client device, and the second client device can comprise a computing platform different from the first client device. In response to the first request, an application engine from a pre-instantiated application engine pool of a plurality of pre-instantiated application engine pools can be reserved for executing the cloud-based client application remotely from the first client device. Further, interaction data can be received from the first client device as the user engages with a first media data associated with the cloud-based client application. The cloud-based client application executing within the application engine that is reserved can be modified based on the interaction data received from the first client device. A second request can be received from the first client device to end the interactive session with the cloud-based client application that can be modified. The application engine that can be reserved can be deallocated in response to the second request. The application engine that can be reserved can be delinked from the first client device.

Further, the first media data can be streamed from the cloud-based client application to the first client device. Additionally, second media data from the cloud-based client application that can be modified can be streamed to a browser application executing on the first client device. Further, the application engine that can be reserved can be linked to the first client device for a duration of the interactive session, and a pre-instantiated application engine can be added to the pre-instantiated application engine pool to replace the application engine that can be reserved. Each pre-instantiated application engine pool of the plurality of pre-instantiated application engine pools can be associated with a different cloud-based client application. The first request can include at least one characteristic associated with the first client device. The at least one characteristic can characterize a geographical area associated with the first client device, and the modifying of the cloud-based client application can comprise presenting, on the first client device, one or more visual features specific to the geographical area associated with the first client device. Additionally, an input can be received from the user prior to the second request from the first client device to end the interactive session, and the interactive session with the cloud-based client application can be paused at a particular position responsive to the input. The pausing can be different from the end to the interactive session. An additional input can be received for resuming the interactive session on a third client device. It is noted that the interactive session can be resumed on the third client device at the particular position responsive to the receiving of the additional input.

In another aspect, a system can comprise at least one data processor and memory storing instructions, which, when executed by the at least one data processor, can cause the at least one data processor to perform operations. These operations can include receiving a first request from a first client device of a user to initiate an interactive session with a cloud-based client application, wherein the cloud-based client application can be configured to execute on a second client device, and wherein the second client device can comprise a computing platform different from the first client device. Further, the operations can comprise reserving, in response to the first request, an application engine from a pre-instantiated application engine pool of a plurality of pre-instantiated application engine pools for executing the cloud-based client application remotely from the first client device. The operations can also comprise receiving interaction data from the first client device as the user engages with a first media data associated with the cloud-based client application. Additionally, the operations can comprise modifying the cloud-based client application executing within the application engine that can be reserved based on the interaction data, receiving a second request from the first client device to end the interactive session with the cloud-based client application that is modified, and deallocating, in response to the second request, the application engine that can be reserved. The application engine that can be reserved can be delinked from the first client device.

In yet another aspect, a non-transitory computer program product stores executable instructions, which, when executed by at least one data processor forming part of at least one computing system, implements various operations. These operations can comprise receiving a first request from a first client device of a user to initiate an interactive session with a cloud-based client application, wherein the cloud-based client application can be configured to execute on a second client device, and wherein the second client device can comprise a computing platform different from the first client device. Further, the operations can comprise reserving, in response to the first request, an application engine from a pre-instantiated application engine pool of a plurality of pre-instantiated application engine pools for executing the cloud-based client application remotely from the first client device. The operations can also comprise receiving interaction data from the first client device as the user engages with a first media data associated with the cloud-based client application. Additionally, the operations can comprise modifying the cloud-based client application executing within the application engine that can be reserved based on the interaction data, receiving a second request from the first client device to end the interactive session with the cloud-based client application that is modified, and deallocating, in response to the second request, the application engine that can be reserved. The application engine that can be reserved can be delinked from the first client device.

Computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

BRIEF DESCRIPTION OF THE DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Figure 1:
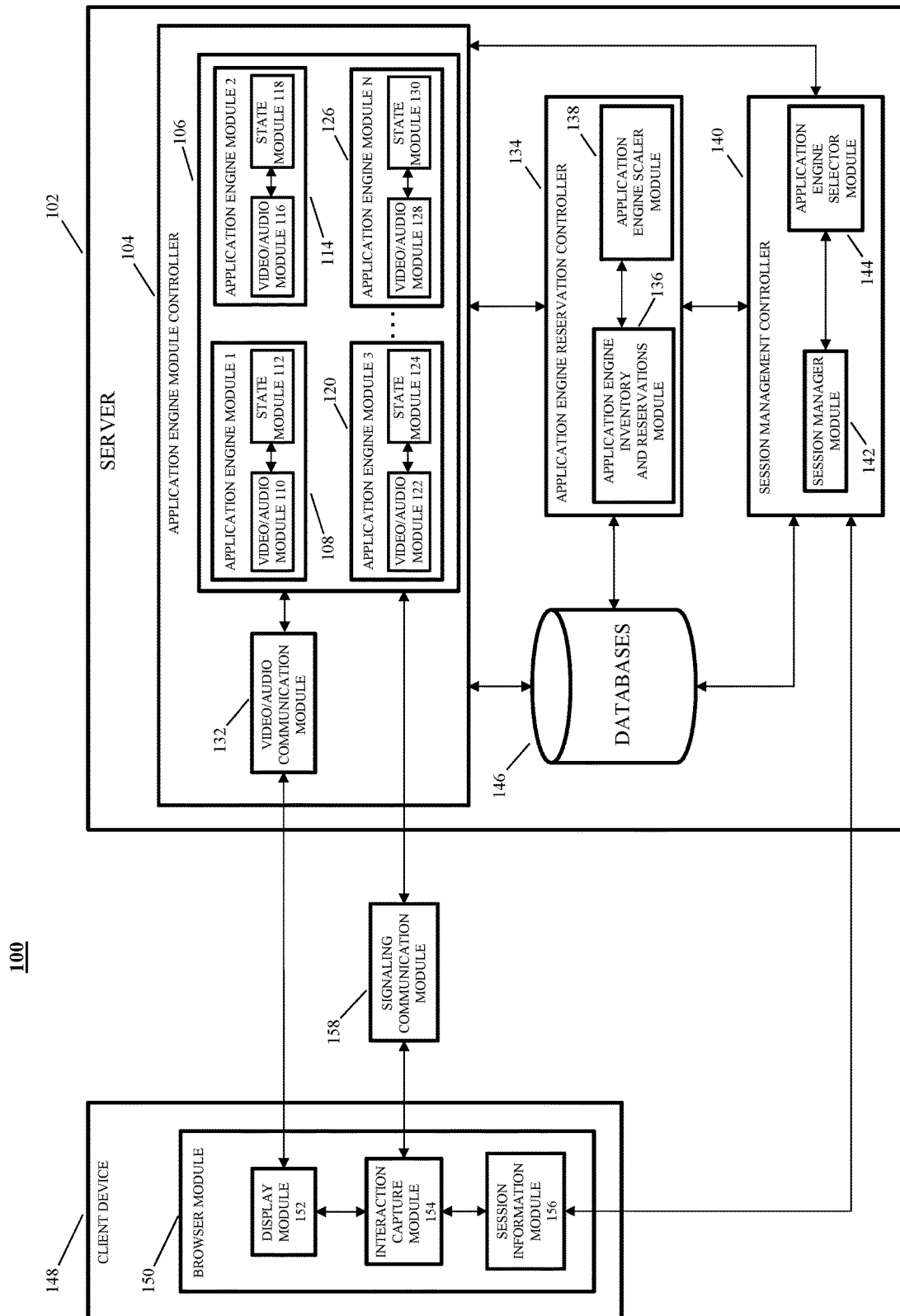
FIG. 1 is a block diagram illustrating an example cloud-based client application platform for remotely interacting with cloud-based client applications.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The present invention is directed to a system and method for remotely interacting with cloud-based client applications. According to the present invention, a client application can be rendered remotely on an emulated client device on a cloud-based client application platform. The video and audio from the cloud-based client application can be streamed in real-time to a browser or other application running on the client device of a user. The user can interact with the cloud-based client application through the local browser or application as if the client application was running natively on the client device. Inputs from the user can be transmitted back to the remote emulated device to allow the user to control and interact with the cloud-based client application in real-time. The present invention can support remote interaction with any suitable type of cloud-based client application for any type of client device (e.g., smartphones, tablets, laptops, desktop computers, gaming consoles, and the like) running any type of operating system and independent of the underlying hardware and device characteristics of the client device. Cloud-based client applications can include, for example, mobile games or any other suitable type of client application designed to operate on a client device, but which are capable of being rendered remotely and controlled remotely on a client device according to embodiments of the present invention. The present invention can simplify the process of client application distribution, since users would not need to install each cloud-based client application, can try many different cloud-based client applications easily, and can switch and move between cloud-based client applications with ease on any client device or combination of client devices. Some implementations of the present invention can also support the integration of a cloud-based client application into third-party applications and websites. Such integration can allow those third-party applications and websites to more easily offer different features and functionality via the integrated cloud-based client application that complement and enhance the interaction and engagement with the third-party applications and websites. Merely for purposes of discussion and not limitation, the present disclosure can refer to cloud-based mobile games as an exemplary cloud-based client application to illustrate various aspects of the present invention. However, the present invention can be used in and with any suitable type of client application that is capable of being rendered remotely and controlled remotely on a client device.

FIG. 1 is a block diagram illustrating an example cloud-based client application platform 100 for remotely interacting with cloud-based client applications, in accordance with embodiments of the disclosure. The cloud-based client application platform 100 can include a server system 102. The server can be cloud-based (e.g., Amazon Web Services, Google Cloud, Microsoft Azure, or other suitable cloud-based infrastructure provider) or be comprised of dedicated server hardware. The server system 102 can include an application engine module controller 104. The application engine module controller 104 can include a plurality of application engine modules 106 to support any appropriate type of cloud-based client application. In embodiments, each application engine module of the plurality of application engine modules 106 can be configured to emulate a particular type and configuration of client device for executing a cloud-based client application. For example, in some implementations of the present invention, each or any of the application engine modules can comprise a suitable client device emulator. Each cloud-based client application can execute within a respective application engine module in the plurality of application engine modules 106 as if the cloud-based client application was executing natively on the given client device. The application engine module controller 104 can allow registration/deregistration of application engine modules, atomic reservation of application engine modules, querying of application engine modules, and the like. The plurality of application engine modules 106 can include a first application engine module 108, a second application engine module 114, a third application engine module 120, . . . , and a Nth application engine module 126, where N can be any suitable natural number and can vary over time, as discussed below. Each application engine module 108, 114, 120, . . . 126 can include a video/audio module for managing video and/or audio media data generated by the cloud-based client application executing in the respective application engine module and transmitting or otherwise streaming such video and/or audio media data to a client device for display to a user. Each application engine module 108, 114, 120, . . . 126 can also include a state module for receiving and processing input (e.g., mapping input to the video/audio stream, etc.) from the client device generated while the user (remotely) interacts with the cloud-based client application. Each state module can also maintain the state of the cloud-based client application executing in the respective application engine module 108, 114, 120, . . . 126. For example, the first application engine module 108 can include a first video/audio module 110 in communication with a first state module 112. The second application engine module 114 can include a second video/audio module 116 in communication with a second state module 118. The third application engine module 120 can include a third video/audio module 122 in communication with a third state module 124. The Nth application engine module 126 can include a Nth video/audio module 128 in communication with a Nth state module 120. The application engine module controller 104 can maintain any suitable number of application engine modules and register (i.e., instantiate, allocate, or otherwise create) or deregister (i.e., delete or deallocate) application engine modules as necessary. In an embodiment, the server system 102 can include a plurality of application engine module controllers 104, with each application engine module controller 104 managing respective pluralities of application engine modules 106 to form one or more application engine module clusters.

In some implementations of the present invention, each application engine module 108, 114, 120, . . . 126 can run as an essential container in a ReplicaSet in Kubernetes or the like with, for example, a webRTC bridge (a media channel for video/audio media data), OpenGL, or other suitable technology to support real-time media communication capabilities with browsers or other appropriate applications running on the client devices. A ReplicaSet is a process that can run multiple instances of an application engine module and keep the specified number of application engine modules constant. The ReplicaSet can maintain the specified number of application engine module instances running in or with the application engine module controller 104 at any given time to prevent users from losing access to their cloud-based client application when an application engine module fails or is inaccessible. In an embodiment, each application engine module 108, 114, 120, . . . 126 can also include an envoy proxy (as either or both an egress proxy or an ingress proxy) that can handle health checks and the like and, for example, CORS (Cross-Origin Resource Sharing) requests or other like requests. Additionally or alternatively, each application engine module 108, 114, 120, . . . 126 can include a debug bridge for receiving and processing debug and other application engine commands (e.g., from the application engine reservation controller 134 discussed below).

In an embodiment, the application engine module controller 104 can include a video/audio communication module 132 to support media communication between an application engine module of the plurality of application engine modules 106 and the client device. In an alternative embodiment, the video/audio communication module 132 can reside within the server system 102 but outside of and in communication with the application engine module controller 104. Additionally or alternatively, each or any application engine module of the plurality of application engine modules 106 can include or be in communication with a respective video/audio communication module 132. In other words, each or any of a plurality of video/audio communication modules 132 can reside in or be associated with each or any of the application engine modules of the plurality of application engine modules 106. In some implementations of the present invention, the video/audio communication module 132 can comprise a TURN (Traversal Using Relay NAT) server or the like (e.g., a STUN (Session Traversal Utilities for NAT) server, etc.) to support communication of video/audio media data between an application engine module and the client device. Additionally or alternatively, the video/audio communication module 132 can comprise a suitable encoder to encode video to, for example, h.264 or VP8 for WebRTC or the like. However, other suitable server communication protocols, encoding techniques, and/or transmission protocols for video/audio media data are possible.

The server system 102 can include an application engine reservation controller 134 in communication with the application engine module controller 104. In embodiments, the application engine reservation controller 134 can control various aspects of the plurality of application engine modules 106, including, for example, orchestrating application engine module scaling, controlling application engine module access, managing application engine module initialization for users, and the like. The application engine reservation controller 134 can include an application engine inventory and reservations module 136. The application engine inventory and reservations module 136 can track and manage the inventory of all application engine modules in the plurality of application engine modules 106. The application engine inventory and reservations module 136 can also grant application engine module reservations for use in active sessions. In some implementations of the present invention, when a user requests initiation of an active session with a cloud-based client application, the application engine inventory and reservations module 136 can reserve an appropriate application engine module, load or cause to load the reserved application engine module with the requested cloud-based client application (if not already loaded or pre-loaded), populate or cause to populate the loaded cloud-based client application with the appropriate user and/or application data (e.g., user profile information, user account information, application state information, etc. to support user interaction and engagement with the cloud-based client application), and bind or otherwise link the reserved application engine module to that active session. If no application engine module is available for the active session, the application engine inventory and reservations module 136 can instruct the application engine module controller 104 (e.g., via the application engine scaler module 138, discussed below) to add and register a new application engine module for the requested active session.

In some implementations of the present invention, the registration process can be performed asynchronously. For example, the application engine inventory and reservations module 136 can wait for the new application engine module to be added and reserved by polling the application engine module controller 104 periodically or receiving an appropriate message from the application engine module controller 104 once the task has been completed. Once the application engine module is registered, it can be reserved for and bound to the active session. In some implementations of the present invention, the application engine module that has been reserved for the active session can be accessible only to the user that requested it, and only for the lifespan of the active session. In other words, an application engine module that has been reserved for a particular active session may not be used or accessed by another user during that active session. In some implementations of the present invention, the data stored in or otherwise used by the reserved application engine module during the active session can be ephemeral. For example, the application engine module can be deregistered at the end of an active session. Accordingly, any and all data stored or otherwise used by the application engine module during that active session can be deleted, for example, no later than the deregistration of the application engine module. In an alternative embodiment, the data stored in or otherwise used by the reserved application engine module during the active session can be stored (e.g., in databases 146), retrieved, and used in and with a subsequent active session by the user. Once the application engine module has been deregistered, it can be reused for another active session or its computing resources can be reallocated to a different application engine module.

In embodiments, the application engine reservation controller 134 can include an application engine scaler module 138 in communication with the application engine inventory and reservations module 136. The application engine scaler module 138 can respond to inventory and reservation changes by adding and instantiating new application engine modules to the plurality of application engine modules 106. The application engine scaler module 138 can proactively scale the number of application engine modules in the plurality of application engine modules 106 based on, for example, usage trends or other suitable metrics to maintain a sufficiently-sized pool of reservable application engine modules. For example, the application engine scaler module 138 can store a predetermined threshold (e.g., provided or generated based on usage trends or other appropriate metrics) for the size of the pool of the plurality of application engine modules 106. If the number of reservable application engine modules decreases below the predetermined threshold, the application engine scaler module 138 can add new application engine modules to the plurality of application engine modules 106 to increase the number of reservable application engine modules above the predetermined threshold. If the increase in the number of reservable application engine modules becomes too great (e.g., above a second predetermined threshold), the application engine scaler module 138 can either do nothing or can delete or otherwise deallocate unneeded extra application engine modules from the plurality of application engine modules 106. Additionally or alternatively, suitable machine learning/artificial intelligence techniques can be used by or with the application engine scaler module 138 to appropriately and dynamically scale the number of reservable application engine modules in the plurality of application engine modules 106. For example, a machine learning model can be trained based on usage data from users (e.g., usage trends, peak usage, off-hour usage, etc.). The machine learning model can then be used to dynamically add and delete/deallocate application engine modules in the plurality of application engine modules 106. The machine learning model can be updated or otherwise adapted as the usage data evolves over time.

In some implementations of the present invention, the plurality of application engine modules 106 can be associated with or otherwise correspond to and be in communication with one or more application engine module pools, which can be managed by, for example, the application engine inventory and reservations module 136 and/or the application engine scaler module 138. For example, the application engine modules for each or any emulated client device supported by the cloud-based client application platform 100 can be maintained in a single, large application engine module pool. Application engine modules for active sessions requested by users can be allocated, reserved, and instantiated from such a single application engine module pool by, for example, the application engine inventory and reservations module 136 and/or the application engine scaler module 138. However, accessing and instantiating each application engine module from such a single, large application engine module pool can create potential bottlenecks. For example, it can take a substantial amount of time and computing resources to spin-up each application engine module separately, particularly when there could be tens of thousands, hundreds of thousands, or even millions of users for which corresponding application engine modules are being instantiated for the cloud-based client application platform 100 at any given time. The resulting allocation delays could adversely affect performance of and user interaction with the cloud-based client application platform 100, which could result in user dissatisfaction and even user churn.

Figure 2:
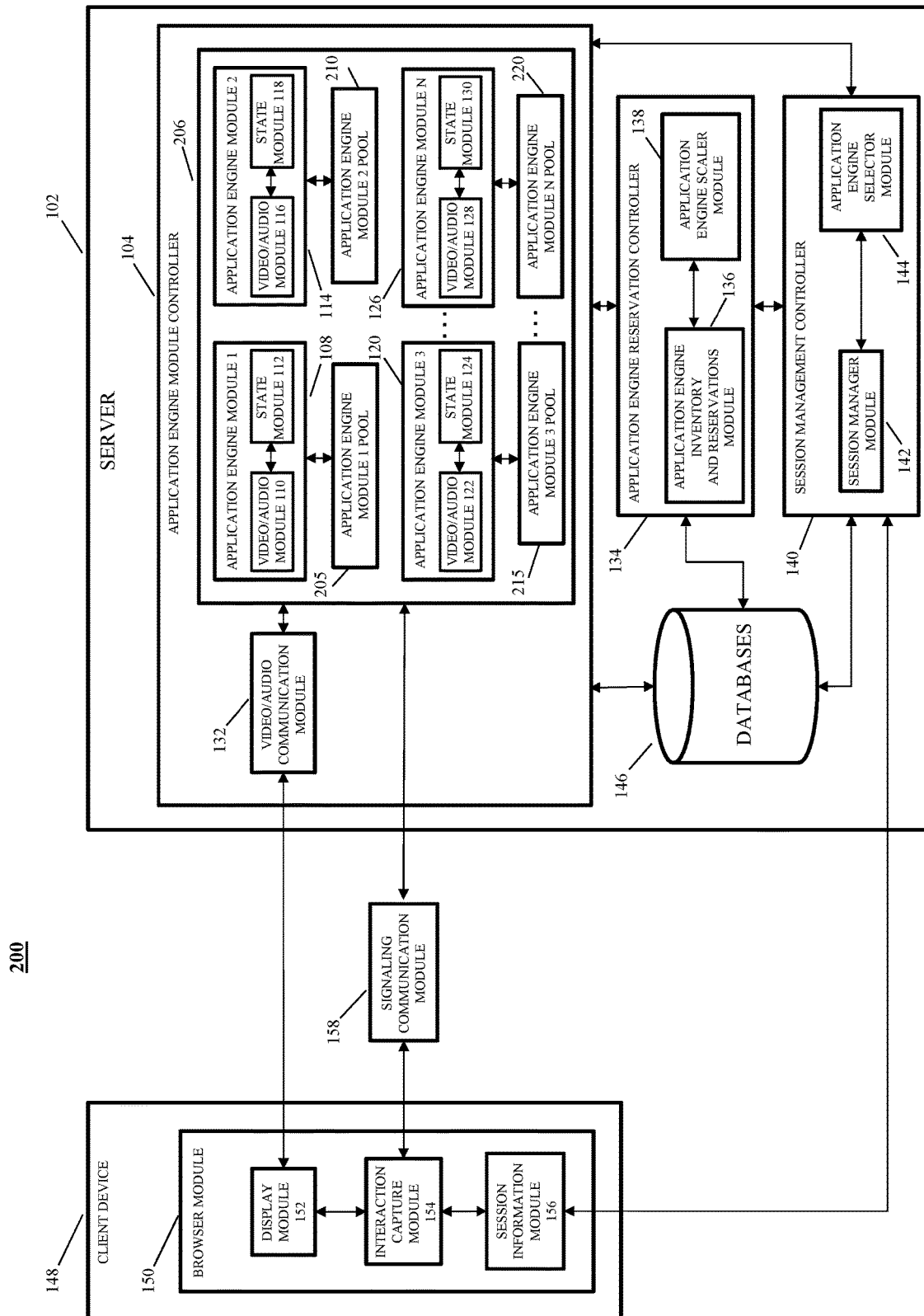
FIG. 2 is a block diagram illustrating an example cloud-based client application platform with a plurality of application engine module pools for remotely interacting with cloud-based client applications.

FIG. 2 is a block diagram illustrating an example cloud-based client application platform 200 with a plurality of application engine module pools for remotely interacting with cloud-based client applications, in accordance with embodiments of the disclosure. In some implementations of the present invention, each or any of a plurality of application engine modules 206 can be associated and in communication with a separate application engine module pool that can be maintained by, for example, the application engine inventory and reservations module 136 and/or the application engine scaler module 138, with each application engine module pool supporting an individual type of application engine module or a set of related types of application engine modules. The plurality of application engine modules 206 can operate in a manner similar to that discussed and described with respect to the plurality of application engine modules 106 in FIG. 1. In the embodiment illustrated in FIG. 2, each cloud-based client application can have or be associated with its own individual application engine module pool. For example, each pool of the plurality of application engine module pools can be configured to support a single cloud-based client application, such that each pool of the plurality of application engine module pools can be allocated on a per cloud-based client application basis. For purposes of illustration and not limitation, a klondike solitaire mobile game designed to run on an Android smartphone can be supported by the first application engine module 108, which can be associated with a first application engine module pool 205 of first application engine modules. A klondike solitaire PC game designed to run on a PC laptop can be supported by the second application engine module 114, which can be associated with a second application engine module pool 210 of second application engine modules. A klondike solitaire mobile game designed to run on an iOS smartphone can be supported by the third application engine module 120, which can be associated with a third application engine module pool 215 of third application engine modules. A klondike solitaire game designed to run on a game console can be supported by the Nth application engine module 126, which can be associated with an Nth application engine module pool 220 of Nth application engine modules, and so forth. Alternatively, each pool of the plurality of application engine module pools can be configured to support a set of related application engine modules (e.g., application engine modules that emulate Android smartphones, such as with a particular operating system version), such that each pool of the plurality of application engine module pools can be allocated on a per application engine module-type basis. Any suitable number of application engine module pools can be maintained and supported for any appropriate number of application engine modules by, for example, the application engine inventory and reservations module 136 and/or the application engine scaler module 138, depending on, for instance, the number of cloud-based client applications (or, alternatively, application engine module types) supported by the system or any appropriate subset thereof.

In some implementations of the present invention, each or any of the application engine modules in each pool of the plurality of application engine module pools can be "pre-warmed." For example, the application engine modules in each pool of the plurality of application engine module pools can be pre-allocated and pre-instantiated within the application engine module pool and then put into standby or sleep mode by, for instance, the application engine inventory and reservations module 136 and/or the application engine scaler module 138. By spinning up the application engine modules in each application engine module pool in the background and maintaining those spun-up application engine modules in a standby mode, an application engine module can be immediately (or nearly immediately) reserved and assigned to a user upon request of an active session with little or no concomitant delay, since awakening an application engine module that is in standby mode can take substantially less time than instantiating the application engine module from scratch. Once an application engine module in an application engine module pool is reserved and assigned, the reserved and assigned application engine module can be immediately (or nearly immediately) replaced by another "pre-warmed" application engine module from the corresponding application engine module pool so that it can be ready for immediate (or nearly immediate) reservation by and assignment to the next user requesting an active session. Such a "pre-warmed" replacement process can continue as each application engine module in an application engine module pool is reserved and assigned. In such a manner, application engine modules from each pool of the plurality of application engine module pools can be allocated to users in real-time. In the present disclosure, "real-time" can refer to processing that can occur instantaneously or within a short period of time (e.g., a few seconds) so that there are minimal delays between when the request is received and when the request is processed and the response provided. The computing resources allocated to a reserved application engine module for an active session can be deleted or otherwise deallocated immediately (or nearly immediately) once the active session ends and the reserved application engine module is no longer needed for that active session. In some implementations of the present invention, such freed up computing resources can be re-allocated by, for example, the application engine inventory and reservations module 136 and/or the application engine scaler module 138 to add and pre-warm another application engine module in the associated application engine module pool or a different application engine module pool, rather than maintaining computing resources for a reserved application engine module that is no longer needed for an inactive session.

The size of each or any of the plurality of application engine module pools can be fixed or dynamic. For example, the size of an application engine module pool can be fixed such that a predetermined application engine module pool size number of pre-warmed application engine modules can be maintained in the pool. As pre-warmed application engine modules in an application engine module pool are allocated, the application engine inventory and reservations modules 136 and/or the application engine scaler module 138 can replace the allocated application engine modules with additional pre-warmed application engine modules to maintain the size of the application engine module pool at or around the predetermined application engine module pool size number. The predetermined application engine module pool size number can be based on, for example, usage trends, historical usage information, or other appropriate metrics and the like for the particular application engine module. Accordingly, highly used application engine modules can have a greater predetermined application engine module pool size number while less used application engine modules can have a smaller predetermined application engine module pool size number.

Additionally or alternatively, the size of an application engine module pool can be dynamic. In some implementations of the present invention, the application engine inventory and reservations module 136 and/or the application engine scaler module 138 can monitor in real-time the usage trends of each or any of the plurality of application engine modules 206. For example, as usage trends increase for a particular application engine module, the application engine scaler module 138 can increase the size of the associated application engine module pool (and, therefore, the number of pre-warmed application engine modules maintained in the application engine module pool) to accommodate the greater usage so that application engine module allocation can continue in real-time without added delay. Conversely, as usage trends decrease for a particular application engine module, the application engine scaler module 138 can decrease the size of the associated application engine module pool (and, therefore, the number of pre-warmed application engine modules maintained in the application engine module pool) to accommodate the lower usage so that computing resources are not unnecessarily overused and can be allocated elsewhere. In such an embodiment, the size of each or any of the application engine module pools can be dynamically altered to accommodate periods of increased use (e.g., spikes in usage) as well as lulls in usage to maintain real-time allocation of application engine modules.

In some implementations of the present invention, the application engine inventory and reservations module 136 and/or the application engine scaler module 138 can include a suitable predictive model or use appropriate machine learning/artificial intelligence techniques to determine the size of an application engine module pool of the plurality of application engine module pools. For example, a machine learning model can be trained based on usage trend data for each supported application engine module to modify the application engine module pool size for an application engine module to minimize the amount of time to allocate the application engine module and maintain a reduced allocation time for the real-time application engine module allocation. The machine learning model can then be used to dynamically and appropriately modify the size of the application engine module pool associated with the application engine module based on the usage exhibited at a particular time for that application engine module. The machine learning model can be updated or otherwise adapted as the usage trends for the application engine module change and evolve over time, as monitored by, for example, the application engine inventory and reservations module 136 and/or the application engine scaler module 138. In some implementations of the present invention, the size of each application engine module pool in a subset of the plurality of application engine module pools can be fixed while the size of other application engine module pools in the plurality of application engine module pools can be dynamic. For example, application engine modules that are highly used can be associated with application engine module pools whose sizes are dynamic, while application engine modules that are less used can be associated with application engine module pools whose sizes are fixed. Additionally or alternatively, the size of a particular application engine module pool can be fixed at certain times and dynamic at other times. For example, for an application engine module that generally experiences lower usage, the size of the corresponding application engine module pool can be fixed. However, during (e.g., intermittent) periods of higher usage (e.g., usage spikes), the size of the corresponding application engine module pool can be dynamic. The application engine inventory and reservations module 136 and/or the application engine scaler module 138 can switch the size of the application engine module pool back to fixed once the period of higher usage ends. In this way, the application engine inventory and reservations module 136 and/or the application engine scaler module 138 can adapt to changing usage conditions as necessary to maintain a reduced allocation time for the real-time allocation of application engine modules.

In some implementations of the present invention, the one or more application engine module pools can be maintained in and with the plurality of application engine modules 206, as illustrated in FIG. 2. However, in some implementations of the present invention, each or any of the one or more application engine module pools can be maintained in or with the application engine module controller 104 outside of the plurality of application engine modules 206 but within the server system 102. Additionally or alternatively, each or any of the one or more application engine module pools can be maintained in or with the server system 102, but outside of the application engine module controller 104, such as, for example, in databases 146. Additionally or alternatively, each or any of the one or more application engine module pools can be maintained in or with a suitable cloud or server storage system that is remote from and in communication with the server system 102.

As illustrated in FIGS. 1 and 2, the server system 102 can include a session management controller 140 for managing active sessions. The session management controller 140 can be in communication with the application engine reservation controller 134. In some implementations of the present invention, the session management controller 140 can also be coupled to or otherwise in communication with the application engine module controller 104. The session management controller 140 can include a session manager module 142 for managing the allocation of application engine modules, including registration, deregistration, and scaling (e.g., in communication and coordination with the application engine inventory and reservations module 136 and the application engine scaler module 138). The session manager module 142 can also act as coordinator for the server system 102 to support, for example, load balancing and latency. The session manager module 142 can receive a request from the client device to initiate an active session. Additionally, the session manager module 142 can receive session information from the client device (e.g., in addition to or as part of the request) that can be used to select an appropriate application engine module. In an embodiment, the session information received from the client device can include, for example, one or more characteristics of the cloud-based client application for which an active session is requested, one or more characteristics of the client device (e.g., client device type, operating system, etc.), and other like characteristics or data.

The session management controller 140 can include an application engine selector module 144 in communication with the session manager module 142. The session manager module 142 can pass the received session information to the application engine selector module 144, which can use such information to select an appropriate application engine module for the requested active session. For purposes of illustration and not limitation, a user with a non-Android client device, such as, for example, a PC laptop, can request an active session with a (cloud-based) klondike solitaire mobile game designed to run on an Android smartphone. Based on the session information passed to the application engine selector module 144, the application engine selector module 144 can select an Android application engine module for the (cloud-based) klondike solitaire mobile game for the active session. The application engine selector module 144 can be in communication with the application engine inventory and reservations module 136. Consequently, the application engine selector module 144 can instruct the application engine inventory and reservations module 136 to reserve an Android application engine module for the (cloud-based) klondike solitaire mobile game from the plurality of application engine modules 106 or 206. Once reserved, the Android klondike solitaire mobile game application engine module can be bound to the requested active session so that no other user can use that reserved application engine module during the active session. The application engine selector module 144 can issue a command (e.g., passed to the reserved Android mobile game application engine module via the application engine inventory and reservations module 136) to start the (cloud-based) klondike solitaire mobile game in the Android application engine module. The user can then begin remotely interacting with the (cloud-based) klondike solitaire mobile game via their PC laptop as if the klondike solitaire mobile game was executing natively on the PC laptop itself. If an Android klondike solitaire cloud-based mobile game application engine module is not available, the application engine inventory and reservations module 136 can instruct the application engine scaler module 138 to add and reserve an Android klondike solitaire cloud-based client game application engine module to the plurality of application engine modules 106 or 206 in the manner described above.

In some implementations of the present invention, the session management controller 140 (e.g., the session manager module 142 and the application engine selector module 144) can coordinate with and control the application engine reservation controller 134 (e.g., the application engine inventory and reservations module 136 and application engine scaler module 138) to manage the one or more application engine module pools as illustrated and discussed with respect to FIG. 2. Additionally or alternatively, the session management controller 140 can directly coordinate with and control the application engine module controller 104 to manage the one or more application engine module pools.

In an embodiment, since the application engine reservation controller 134 can identify and maintain, for example, usage trends for application engine modules (e.g., per user, for all users, or any subset thereof), some implementations of the present invention can also recommend cloud-based client applications to each or any user. In an embodiment, the session manager module 142 can include a recommendations engine or the like. The recommendations engine can receive usage trend information from the application engine reservation controller 134 and use such information to recommend different cloud-based client applications to users. For example, the recommendations engine can recommend the most popular cloud-based client application (e.g., overall, in a particular genre, for users using a particular type of client device, etc.), a list of most popular cloud-based client applications at a particular time or over a range of time (e.g., the past hour, the past day, the past week, etc.), and the like. The recommendations engine can also recommend cloud-based client applications that are similar to or complement one or more cloud-based client applications with which a user has interacted previously. For example, if the user has played a cloud-based klondike solitaire mobile game, the recommendations engine can recommend other cloud-based games in the same or similar genre (e.g., spider solitaire, tri peaks solitaire, etc.), regardless of the device platform on which the game is based (since the device platform will be emulated by one of the plurality of application engine modules 106 or 206). Other recommendations are possible. Additionally or alternatively, suitable machine learning/artificial intelligence techniques can be used by the recommendation engine to dynamically provide cloud-based client application recommendations to users. For example, a machine learning model can be trained based on usage data from users (e.g., usage trends for all users or any subset thereof, peak usage, off-hour usage, etc.). The machine learning model can then be used to dynamically recommend cloud-based client applications to users based on the usage trends. The machine learning model can be updated or otherwise adapted as the usage data evolves over time. Such recommendations can be communicated to the client device (e.g., as a URL or other link or hyperlink in a modal window or other appropriate notification or message). If a user accepts a recommendation (e.g., by selecting a URL or other link or hyperlink to the cloud-based client application), the session manager module 142 can have the indicated application engine module selected and reserved in the manner described herein to initiate an active session for the user.

The server system 102 can include one or more databases 146 that can be in communication with one or more of the application engine module controller 104, the application engine reservation controller 134, and the session management controller 140. The databases 146 can be cloud-based or reside in one or more physical storage systems. The databases 146 can include, for example, any suitable information related to the application engine modules, management of the application engine modules, active session information, historical session information, usage trend or other metric data, cloud-based client application state data, copies of each or any cloud-based client application, input from the client devices, session logs, and other like data.

In some implementations of the present invention, the cloud-based client application platform 100 or 200 can include one or more client devices 148 in communication with the server system 102 (e.g., via the Internet or other suitable network). According to embodiments, the client device 148 can be any suitable type of device that is capable of running an appropriate browser or other suitable application through which a user can interact (e.g., via touchscreen or pointing device, such as a mouse, stylus, or the like), such as, for example, a smartphone, a tablet, a laptop, a desktop computer, a game console, a smart television, a smart watch, or any other appropriate device that is capable of supporting such user input and interaction through the browser or other suitable application. In embodiments, the present invention can support interaction with any appropriate type of cloud-based client application on any suitable number of client devices 148 each running any appropriate type of operating system and independent of the underlying hardware and device characteristics of the client device 148.

The cloud-based client application can be any appropriate client application that is configured to execute natively on any suitable type of client device 148, but can be remotely executed and rendered in the cloud in an application engine module of the plurality of application engine modules 106 or 206 of the server system 102 in accordance with embodiments of the present invention. The cloud-based client application, such as, for example, a cloud-based mobile game or other web-based or suitable cloud-based client application, can be remotely provided as an end-user client application with which the users can interact via the server system 102. The cloud-based client application can relate to and/or provide a wide variety of functions and information, including, for example, entertainment (e.g., a game, music, videos, etc.), business (e.g., word processing, accounting, spreadsheets, etc.), news, weather, finance, sports, etc. In certain embodiments, the cloud-based client application can provide a digital game, such as a mobile digital game, a PC game, or a console game. The digital game can be or include, for example, a sports game, an adventure game, a virtual playing card game, a virtual board game, a puzzle game, a racing game, or any other appropriate type of digital game. In an embodiment, the digital game can be an asynchronous competitive skill-based game, in which players can compete each against other in the digital game, but do not have to play the digital game at the same time. In an alternative embodiment, the digital game can be a synchronous competitive skill-based game, in which players can play the digital game at the same time and can compete against each other in the digital game in real-time. Other suitable cloud-based digital games are possible, whether mobile-based, PC-based, console-based, or otherwise. For cloud-based client applications in which two or more users can compete against or otherwise engage with each other, each user can interact with the cloud-based client application in a respective reserved and assigned application engine module and compete, play against, or otherwise engage or interact with each other using the respective application engine modules and the backend architecture supported by the cloud-based client application (e.g., game servers and the like in the context of digital games). Additionally or alternatively, one or more users interacting with the cloud-based client application in a respective reserved and assigned application engine module can compete, play against, or otherwise engage or interact with users who are interacting with the client application installed directly and executing natively on their client device (i.e., without the use of application engine modules). Consequently, embodiments of the present invention can allow users across a wide variety of different computing platforms to engage with each other independent of the underlying client device 148 and operating platform used by each or any user for their client device 148.

The client device 148 can include a browser module 150. The browser module 150 can support any suitable type of browser application, such as, for example, Google Chrome, Mozilla Firefox, Microsoft Edge, Apple Safari, DuckDuckGo, Opera, Brave, Vivaldi, Firefox Focus, a proprietary browser, or the like. Additionally or alternatively, the browser module 150 can be a suitable application capable of supporting the local rendering of the video/audio information streamed from the cloud-based client applications to the client device 148 (e.g., via OpenGL or the like). In an embodiment, the browser module 150 can include a display module 152, an interaction capture module 154, and a session information module 156 in communication with each other. The display module 152 can support the display of video and/or audio information streamed from the cloud-based client application running in the corresponding application engine module executing on the server system 102. In an embodiment, the video/audio output of the cloud-based client application running in an application engine module can be streamed in real-time via the Internet (or other suitable network) to the browser module 150 on the client device 148 and displayed to the user via the display module 152. The display module 152 can receive the streamed video/audio output from the application engine module via the video/audio communication module 132 and render it appropriately on the display screen of the client device 148. The user can interact with the video/audio stream of the cloud-based client application in real-time. In some implementations of the present invention, the user's inputs can be collected by the interaction capture module 154 and communicated (over the Internet or other suitable network) to the application engine module in the plurality of application engine modules 106 or 206 that has been assigned to the user's active session via one or more signaling communication modules 158 (e.g., a suitable data and signaling channel, such as a gRPC gateway or the like). The user's inputs can then be mapped to the video/audio stream by the state module of the assigned application engine module to allow the user to (remotely) control and interact with the cloud-based client application in real-time as if the cloud-based client application was running natively on the client device 148.

In an embodiment, the display module 152 can also provide a display of any or all cloud-based client applications that are available for use by the user (e.g., as URLs or other links or hyperlinks in the browser application, as linked icons on a desktop in the user interface of the client device 148, etc.). The interaction capture module 154 can capture the user's selection of a desired cloud-based client application (e.g., by the user clicking on or otherwise selecting one of the displayed URLs, links, hyperlinks, or icons). Once the user selects a desired cloud-based client application, the session information module 156 can initiate an active session (e.g., via a REST call or the like) by communicating the request to the session management controller 140. The session management controller 140 can then begin the process of reserving an appropriate application engine module for the active session as described above. The session information module 156 can poll the session management controller 140 periodically (e.g., via REST or the like) until an application engine module has been reserved and assigned for an active session. Alternatively, the session management controller 140 can transmit a suitable message or notification to the session information module 156 when an application engine module has been reserved and assigned for the active session. Once the application engine module has been reserved and assigned to the user's active session, the display module 152 on the client device 148 can connect to the reserved application engine module through the media (video/audio) channel (e.g., via video/audio communication module 132) and begin receiving the streamed video/audio media data from the cloud-based client application. As the user interacts with the video/audio media data being streamed from the cloud-based client application executing within the reserved application engine module, the interaction capture module 154 can provide the captured user input to the reserved application engine module via the signaling communication module 158 (e.g., webRTC signaling, via OpenGL, or other suitable technology) to allow the user to (remotely) control and interact with the cloud-based client application.

Figure 3:
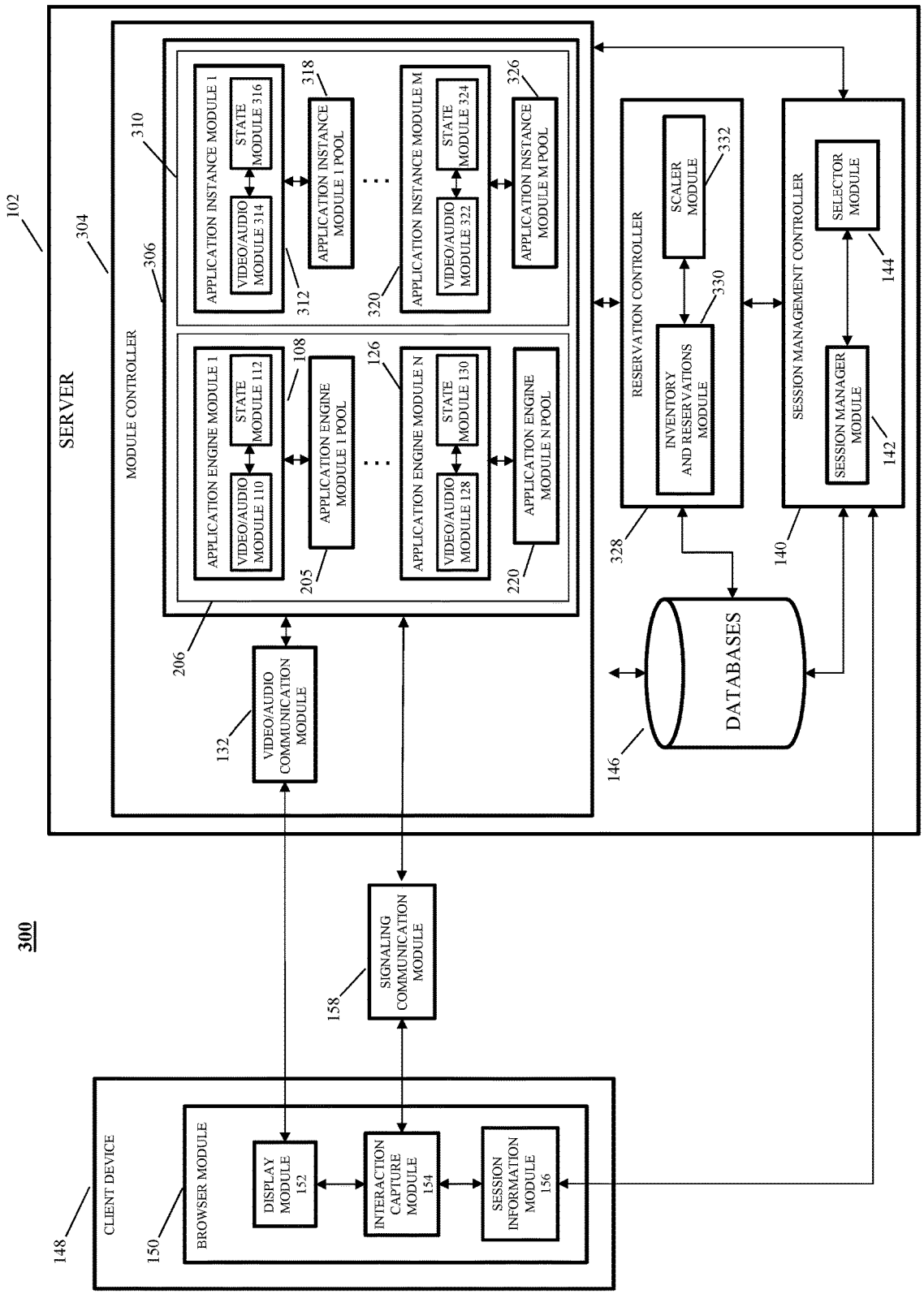
FIG. 3 is a block diagram illustrating an example cloud-based client application platform with a plurality of application engine module pools and a plurality of application instance module pools for remotely interacting with cloud-based client applications.

FIG. 3 is a block diagram illustrating an example cloud-based client application platform 300 with a plurality of application engine module pools and a plurality of application instance pools for remotely interacting with cloud-based client applications, in accordance with embodiments of the disclosure. As discussed previously, each of the application engine modules in the plurality of application engine modules 206 can be configured to emulate a particular type and configuration of client device for executing a cloud-based client application. Additionally or alternatively, the server system 102 can support cloud-based client application instances (also referred to as "application instances") that can be designed and configured to run natively in the cloud on the server system 102. Thus, an application instance can be an instance of a cloud-based client application that can be configured to run natively on the server system 302 without the use of an application engine module from the plurality of application engine modules 206 (or 106). Accordingly, the server system 102 can include a module controller 304, which can operate in a manner similar to that discussed and described with respect to the application engine module controller 104 of FIGS. 1 and 2. The module controller 304 can include a plurality of application engine modules 206 to support and emulate any appropriate type of client device to execute any suitable type of cloud-based client application (as discussed and described with respect to FIGS. 1 and 2) and a plurality of application instance modules 310 to support and execute any appropriate type of application instance that can run natively on the server system 102. The module controller 304 can allow registration/deregistration of application instance modules, atomic reservation of application instance modules, querying of application instance modules, and the like in a manner similar to that described for the plurality of application engine modules 206 (and 106). The plurality of application instance modules 310 can include a first application instance module 312, . . . , and a Mth application instance module 320, where M can be any suitable natural number and can vary over time. Each application instance module 312, . . . 320 can include a video/audio module for managing video and/or audio media data generated by the application instance and transmitting such video and/or audio media data to a client device for display to a user. Each application instance module 312, . . . 320 can also include a state module for receiving and processing input (e.g., mapping input to the video/audio stream, etc.) from the client device 148 generated while the user (remotely) interacts with the application instance. Each state module can also maintain the state of the application instance. For example, the first application instance module 312 can include a first video/audio module 314 in communication with a first state module 316. The Mth application instance module 320 can include a Mth video/audio module 322 in communication with a Mth state module 324. The module controller 304 can maintain any suitable number of application instance modules and register (i.e., instantiate, allocate, or otherwise create) or deregister (i.e., delete or deallocate) application instance modules as necessary. In an embodiment, the server system 102 can include a plurality of module controllers 304, with each module controller 304 managing respective pluralities of application engine modules 206 to form application engine module clusters and respective pluralities of application instance modules 310 to form application instance module clusters. The server system 102 and the module controller 304 can support any suitable number and combination of application engine modules and application instance modules.

As illustrated in FIG. 3, the server system 102 can include a reservation controller 328 in communication with the module controller 304, which can operate in a manner similar to that discussed and described with respect to the application engine reservation controller 134 of FIGS. 1 and 2. In embodiments, the reservation controller 134 can also control various aspects of the plurality of application instance modules 310, including, for example, orchestrating application instance module scaling, controlling application instance module access, managing application instance module initialization for users, and the like. The reservation controller 328 can include an inventory and reservations module 330, which can operate in a manner similar to that discussed and described with respect to the application engine inventory and reservations module 136 of FIGS. 1 and 2. The inventory and reservations module 330 can also track and manage the inventory of all application instance modules in the plurality of application instance modules 310. The inventory and reservations module 330 can grant application instance module reservations for use in active sessions. In some implementations of the present invention, when a user requests initiation of an active session with an application instance module, the inventory and reservations module 330 can reserve an appropriate application instance module, populate or cause to populate the application instance module with the appropriate user and/or application data (e.g., user profile information, user account information, application instance state data, etc. to support user interaction and engagement with the application instance), and bind the reserved application instance module to that active session. If no application instance module is available for the active session, the inventory and reservations module 330 can instruct the module controller 304 (e.g., via the scaler module 332, discussed below) to add and register a new application instance module for use in the requested active session. In some implementations of the present invention, the registration process can be performed asynchronously. For example, the inventory and reservations module 330 can wait for the new application instance module to be added and reserved by polling the module controller 304 periodically or receiving an appropriate message from the module controller 304 once the task has been completed. Once the application instance module is registered, it can be reserved for and bound to the active session. In some implementations of the present invention, the application instance module that has been reserved for the active session can be accessible only to the user that requested it, and only for the lifespan of the active session. In other words, an application instance module that has been reserved for a particular active session may not be used or accessed by another user during that active session. In some implementations of the present invention, the data stored in or otherwise used by the reserved application instance module during the active session can be ephemeral. For example, the application instance module can be deregistered at the end of an active session. Accordingly, any and all data stored or otherwise used by the application instance module during that active session can be deleted, for example, no later than the deregistration of the application instance module. In an alternative embodiment, the data stored in or otherwise used by the reserved application instance module during the active session can be stored (e.g., in databases 146), retrieved, and used in a subsequent active session by the user. Once the application instance module has been deregistered, it can be reused for another active session or its computing resources can be reallocated to a different application instance module.

In embodiments, the reservation controller 328 can include a scaler module 332 in communication with the inventory and reservations module 330, which can operate in a manner similar to that discussed and described with respect to the application engine scaler module 138 of FIGS. 1 and 2. The scaler module 332 can also respond to inventory and reservation changes by adding and instantiating new application instance modules to the plurality of application instance modules 310. The scaler module 332 can proactively scale the number of application instance modules in the plurality of application instance modules 310 based on, for example, usage trends or other suitable metrics to maintain a sufficiently-sized pool of reservable application instance modules. For example, the scaler module 332 can store a predetermined threshold (e.g., provided or generated based on usage trends or other suitable metrics) for the size of the pool of the plurality of application instance modules 310. If the number of reservable application instance modules decreases below the predetermined threshold, the scaler module 332 can add new application instance modules to the plurality of application instance modules 310 to increase the number of reservable application instance modules above the predetermined threshold. If the increase in the number of reservable application instance modules becomes too great (e.g., above a second predetermined threshold), the scaler module 332 can either do nothing or can delete or otherwise deallocate unneeded extra application instance modules from the plurality of application instance modules 310. Additionally or alternatively, suitable machine learning/artificial intelligence techniques can be used by or with the scaler module 332 to appropriately and dynamically scale the number of reservable application instance modules in the plurality of application instance modules 310. For example, a machine learning model can be trained based on usage data from users (e.g., usage trends, peak usage, off-hour usage, etc.). The machine learning model can then be used to dynamically add and delete/deallocate application instance modules in the plurality of application instance modules 310. The machine learning model can be updated or otherwise adapted as the usage data evolves over time.

In some implementations of the present invention, each or any of the plurality of application instance modules 310 can be associated and in communication with a separate application instance module pool that can be maintained by, for example, the inventory and reservations module 330 and/or the scaler module 332, with each application instance module pool supporting an individual type of application instance module or a set of related types of application instance modules. In such an embodiment, each application instance can have or be associated with its own individual application instance module pool. For example, each pool of the plurality of application instance module pools can be configured to support a single application instance, such that each pool of the plurality of application instance module pools can be allocated on a per application instance basis. For purposes of illustration and not limitation, a klondike solitaire game designed to run natively on the server system 102 can be supported by the first application instance module 312, which can be associated with a first application instance module pool 318 of first application instance modules. A bingo game designed to run natively on the server system 102 can be supported by the Nth application instance module 320, which can be associated with an Nth application instance module pool 326 of Nth application instance modules, and so forth. Any suitable number of application instance module pools can be maintained and supported for any appropriate number of application instance modules by, for example, the inventory and reservations module 330 and/or the scaler module 332, depending on, for instance, the number of application instances supported by the system or any appropriate subset thereof.

In some implementations of the present invention, each or any of the application instance modules in each pool of the plurality of application instance module pools can be "pre-warmed." For example, the application instance modules in each pool of the plurality of application instance module pools can be pre-allocated and pre-instantiated within the application instance module pool and then put into standby or sleep mode by, for instance, the inventory and reservations module 330 and/or the scaler module 332. By spinning up the application instance modules in each application instance module pool in the background and maintaining those spun-up application instance modules in a standby mode, an application instance module can be immediately (or nearly immediately) reserved and assigned to a user upon request of an active session with little or no concomitant delay, since awakening an application instance module that is in standby mode can take substantially less time than instantiating the application instance module from scratch. Once an application instance module in an application instance module pool is reserved and assigned, the reserved and assigned application instance module can be immediately (or nearly immediately) replaced by another "pre-warmed" application instance module from the corresponding application instance module pool so that it can be ready for immediate (or nearly immediate) reservation by and assignment to the next user requesting an active session. Such a "pre-warmed" replacement process can continue as each application instance module in an application instance module pool is reserved and assigned. In such a manner, application instance modules from each pool of the plurality of application instance module pools can be allocated to users in real-time. The computing resources allocated to a reserved application instance module for an active session can be deleted or otherwise deallocated immediately (or nearly immediately) once the active session ends and the reserved application instance module is no longer needed for that active session. In some implementations of the present invention, such freed up computing resources can be re-allocated by, for example, the inventory and reservations module 330 and/or the scaler module 332 to add and pre-warm another application instance module in the associated application instance module pool or a different application instance module pool, rather than maintaining computing resources for a reserved application instance module that is no longer needed for an inactive session.

The size of each or any of the plurality of application instance module pools can be fixed or dynamic. For example, the size of an application instance module pool can be fixed such that a predetermined application instance module pool size number of pre-warmed application instance modules can be maintained in the pool. As pre-warmed application instance modules in an application instance module pool are allocated, the inventory and reservations module 330 and/or the scaler module 332 can replace the allocated application instance modules with additional pre-warmed application instance modules to maintain the size of the application instance module pool at or around the predetermined application instance module pool size number. The predetermined application instance module pool size number can be based on, for example, usage trends or other historical usage information and the like for the particular application instance module. Accordingly, highly used application instance modules can have a greater predetermined application instance module pool size number while less used application instance modules can have a smaller predetermined application instance module pool size number.

Additionally or alternatively, the size of an application instance module pool can be dynamic. In some implementations of the present invention, the inventory and reservations module 330 and/or the scaler module 332 can monitor in real-time the usage trends of each or any of the plurality of application instance modules 310. For example, as usage trends increase for a particular application instance module, the scaler module 332 can increase the size of the associated application instance module pool (and, therefore, the number of pre-warmed application instance modules maintained in the application instance module pool) to accommodate the greater usage so that application instance module allocation can continue in real-time without added delay. Conversely, as usage trends decrease for a particular application instance module, the scaler module 332 can decrease the size of the associated application instance module pool (and, therefore, the number of pre-warmed application instance modules maintained in the application instance module pool) to accommodate the lower usage so that computing resources are not unnecessarily overused and can be allocated elsewhere. In such an embodiment, the size of each or any of the application instance module pools can be dynamically altered to accommodate periods of increased use (e.g., spikes in usage) as well as lulls in usage to maintain real-time application instance module allocation.

In some implementations of the present invention, the inventory and reservations module 330 and/or the scaler module 332 can include a suitable predictive model or use appropriate machine learning/artificial intelligence techniques to determine the size of an application instance module pool of the plurality of application instance module pools. For example, a machine learning model can be trained based on usage trend data for each supported application instance module to modify the application instance module pool size for an application instance module to minimize the amount of time to allocate the application instance module and maintain a reduced allocation time for the real-time application instance module allocation. The machine learning model can then be used to dynamically and appropriately modify the size of the application instance module pool associated with the application instance module based on the usage exhibited at a particular time for that application instance module. The machine learning model can be updated or otherwise adapted as the usage trends for the application instance module change and evolve over time, as monitored by, for example, the inventory and reservations module 330 and/or the scaler module 332. In some implementations of the present invention, the size of each application instance module pool in a subset of the plurality of application instance module pools can be fixed while the size of other application instance module pools in the plurality of application instance module pools can be dynamic. For example, application instance modules that are highly used can be associated with application instance module pools whose sizes are dynamic, while application instance modules that are less used can be associated with application instance module pools whose sizes are fixed. Additionally or alternatively, the size of a particular application instance module pool can be fixed at certain times and dynamic at other times. For example, for an application instance module that generally experiences lower usage, the size of the corresponding application instance module pool can be fixed. However, during (e.g., intermittent) periods of higher usage (e.g., usage spikes), the size of the corresponding application instance module pool can be dynamic. The inventory and reservations module 330 and/or the scaler module 332 can switch the size of the application instance module pool back to fixed once the period of higher usage ends. In this way, the inventory and reservations module 330 and/or the scaler module 332 can adapt to changing usage conditions as necessary to maintain a reduced allocation time for the real-time allocation of application instance modules.

In some implementations of the present invention, the one or more application instance module pools can be maintained in and with the plurality of application instance modules 310, as illustrated in FIG. 3. However, in some implementations of the present invention, each or any of the one or more application instance module pools can be maintained in or with the module controller 304 outside of the plurality of application instance modules 310 but within the server system 102. Additionally or alternatively, each or any of the one or more application instance module pools can be maintained in or with the server system 102, but outside of the module controller 304, such as, for example, in databases 146. Additionally or alternatively, each or any of the one or more application instance module pools can be maintained in or with a suitable cloud or server storage system that is remote from and in communication with the server system 102.

In some implementations of the present invention, the reserved and assigned application engine module and/or the reserved and assigned application instance module can each be associated with a different, unique module identification (ID) number or other suitable identifier (e.g., comprised of numeric or alphanumeric characters or the like) that uniquely identifies the reserved and assigned application engine module and/or the reserved and assigned application instance module during the active session. The module ID number can be used by, for example, the session management controller 140 to track and manage the reserved and assigned application engine module and/or the reserved and assigned application instance module during the active session, to ensure that communications from the client device 148 during the active session are addressed and forwarded to the correct application engine module or application instance module and vice versa, and the like. In an embodiment, when the active session has completed, the session information module 156 can send an appropriate message to the session management controller 140 so that the session management controller 140 can disconnect the active session and deregister the application engine module or the application instance module used during the active session. In some implementations of the present invention, any and all data stored or otherwise used by the registered application engine module or the registered application instance module during that active session can be deleted upon deregistration of the application engine module or the application instance module. In an alternative embodiment, the data stored in or otherwise used by the reserved application engine module or the reserved application instance module during the active session can be stored (e.g., in databases 146), retrieved, and used in a subsequent active session by the user. Once the application engine module or the application instance module has been deregistered, it can be reused for another active session or its computing resources reallocated to a different application engine module or application instance module.

In some implementations of the present invention, the cloud-based client application (executing in either an application engine module or an application instance module) can be paused during an active session. For example, the user can pause the cloud-based client application at any particular or desired position, point or time during the active session with the cloud-based client application (e.g., by pressing a suitable "pause" button displayed to the user in or with the browser application). Additionally or alternatively, the cloud-based client application can be paused if the connection between the browser module 150 and the server system 102 is interrupted or lost during the active session. Additionally or alternatively, the cloud-based client application can be paused if the user leaves the active session (e.g., by pressing a browser "back" button or closing the browser application). In some implementations of the present invention, one or more suitable cookies can be stored on the client device 148 (e.g., in or associated with the browser module 150), which the browser module 150 can check to determine if there are any active sessions for the user. Such information can be communicated to the session management controller 140 via the session information module 156. The user's interaction with the cloud-based client application can resume at the point paused once the connection has been reestablished or the user returns to the active session (e.g., by pressing a suitable "play" button displayed to the user in or with the browser, pressing a "forward" button or re-opening the browser application). In an embodiment, the active session can be held open or otherwise maintained for a predetermined period of time (e.g., 1 hour, 2 hours, 1 day, etc.) while the active session is paused or if the user exits or disconnects from the active session. After the predetermined period of time has expired, the active session can be ended and the application engine module or the application instance module can be deregistered. If the user desires to continue the active session before expiration of the predetermined period of time, the user can, for example, press a "play" button, refresh the webpage in the browser application or select the same URL, link, or hyperlink used to initiate the original active session to rejoin the previously assigned and reserved application engine module or application instance module. In some implementations of the present invention, the active session can be held open or otherwise maintained indefinitely until the user exits or otherwise ends the active session.

By maintaining the reserved application engine module or the reserved application instance module and the state of the cloud-based client application during such a pause, some implementations of the present invention can allow users to begin an active session on one client device 148, pause the active session at a particular or desired position, point or time, and then continue the active session on one or more other (different) client devices 148 from the paused position, point or time. For purposes of illustration and not limitation, a user can request to initiate an active session on a first client device 148 (e.g., a smartphone). The user can then pause the active session (e.g., by closing the browser application on the smartphone) at a particular or desired position, point or time. The state of the cloud-based client application can be saved in the state module of the application engine module or application instance module assigned and registered for that active session. The user can then switch to a second client device 148 (e.g., a desktop computer) and select the same URL, link, or hyperlink (through the display module 152 in the browser module 150 running on the second client device 148) that was used to initiate the original active session on the first client device 148. Such action can cause the active session to resume in the browser module 150 of the second client device 148. Thus, the user can be presented with the same digital page of the active session of the cloud-based client application paused at the same position, point or time from the first client device 148. The user can seamlessly continue to interact with the same cloud-based client application via the second client device 148 (e.g., by pressing an appropriate "play" button in the browser application) from the paused position, point or time in the same or similar manner as if the user had continued interacting with the cloud-based client application on the first client device 148. To support such platform switching, the session management controller 140 can maintain a user ID or other appropriate identifier that uniquely identifies the user in addition to the module ID. Using both the user ID and the module ID in combination with the cloud-based client application selection from the user (received from the second client device 148) and the saved state of the cloud-based client application, the session management controller 140 can identify the correct (paused) application engine module or application instance module to re-assign to the second client device 148 to allow the user to continue the active session on the second client device 148 from the same position, point or time paused on the first client device 148. In an alternative embodiment, if the user selects the same cloud-based client application from the same URL, link, or hyperlink on the second client device 148, the user can be presented with a choice of either continuing the same active session of the cloud-based client application from the same paused position, point or time or starting a new active session with the cloud-based client application.

In the event of an outage or crash of an application engine module or application instance module during an active session, the session management controller 140 can reserve and allocate a new application engine module or a new application instance module (depending on which was being used for the active session before the outage or crash) to the user. The cloud-based client application running in the application engine module or the application instance module can be populated with information from the previous active session (e.g., using the cloud-based client application state and other session information retrieved from the databases 146) to mirror the state of the cloud-based client application at the time just before the outage or crash so that it appears to the user that the active session was simply paused. The user can then return to and reengage with the active session in the manner previously described.

In some implementations of the present invention, the session management controller 140 (e.g., via the session manager module 142) can operate in conjunction with the browser module 150 (e.g., via one or both of the display module 152 or the interaction capture module 154) to measure and monitor network latency information or other suitable characteristics of communications between the client device 148 and server system 102 during an active session and to communicate such network latency information to the session management controller 140 (e.g., via the session information module 156). The network latency information can be used by the session management controller 140 to temporarily pause the active session if network latency is above a threshold that is predetermined or dynamic (e.g., based on network latency trends, usage trends, etc.) and then resume the active session once the network latency falls below the threshold. Additionally or alternatively, the network latency information can be used by the server system 102 (e.g., via the video/audio communication module 132) for network connection quality management. For example, the video/audio communication module 132 can use the network latency information to determine the network connection quality to the client device 148. If the network connection quality is below a threshold that is predetermined or dynamic (e.g., based on network latency trends, usage trends, etc.), the video/audio communication module 132 can modify the quality and/or characteristics of the video/audio media data that is being streamed to the client device 148. For example, if the network connection quality is below the threshold, the video/audio communication module 132 can lower the frame rate, lower the resolution, and the like of the streamed video/audio media data so as to maintain smooth display and interaction for the cloud-based client application on the client device 148 during the active session (e.g., to maintain smooth gameplay on the client device 148 in the context of cloud-based mobile games), so that the active session does not need to be paused or otherwise interrupted. The video/audio communication module 132 can update the quality and/or characteristics of the stream of video/audio media data periodically or continuously throughout the active session (e.g., lowering and/or raising the frame rate, resolution, etc. of the video/audio media data stream as the network connection quality fluctuates over the course of the active session). Consequently, the server system 102 can use the network latency information to determine, vary, and control the video/audio streaming quality to the client devices 148 to maintain a smooth display and interaction for the cloud-based client application for the user.

Additionally or alternatively, the network latency information can be used by the session management controller 140 to determine and select appropriate application engine modules or application instance modules for users. For example, in some implementations of the present invention, the server system 102 can include a plurality of application engine module controllers 104, with each application engine module controller 104 managing respective pluralities of application engine modules 106 to form one or more application engine module clusters, as illustrated and discussed with respect to FIGS. 1 and 2. In some implementations of the present invention, the server system 102 can include a plurality of module controllers 304, with each module controller 304 managing respective pluralities of application engine modules 206 to form one or more application engine module clusters and/or managing respective pluralities of application instance modules 310 to form one or more application instance module clusters, as illustrated and discussed with respect to FIG. 3. The application engine module clusters and/or application instance module clusters can be geographically distributed such that each of the respective pluralities of application engine modules 106 or 206 and/or respective pluralities of application instance modules 310 can be located in different geographical locations. When a user requests an active session with a cloud-based client application, the network latency information can be used by the session management controller 140 to cause an application engine module or application instance module to be reserved and assigned that is closest geographically or otherwise has the smallest network latency to the client device 148 of the user. By measuring and monitoring the network latency information for all client devices 148, the server system 102 can create a heat map or the like of the network latencies throughout the cloud-based client application platform 100, 200, or 300 that can be used to reserve and assign an optimal application engine module or an optimal application instance module (e.g., optimal from the standpoint of network latency or network connection quality) to each user so as to maintain smooth display and interaction for the cloud-based client application on the client devices 148 during the respective active sessions.

According to embodiments, because the cloud-based client applications can be run remotely in server system 102 and can be displayed on any suitable client device 148, the present invention can also allow cloud-based client applications to be integrated into third-party platforms, including third party websites and applications, by embedding or otherwise providing a URL or link or hyperlink to one or more cloud-based client applications into the third-party platform. Such integration can allow those third parties to more easily offer different features and functionality via the integrated cloud-based client application that complement and enhance the interaction and engagement with their third-party platforms. For purposes of illustration and not limitation, a retailer can incorporate any suitable cloud-based client application within their consumer touchpoints by embedding or otherwise providing a URL or other link or hyperlink to the cloud-based client application. For example, a retailer can incorporate a cloud-based mobile game into the retailer's website or application in accordance with embodiments of the present invention. A user can interact with the cloud-based mobile game in the retailer's website or application as if the cloud-based mobile game was executing on the user's client device, in the manner described herein. If the user wins the integrated cloud-based mobile game, the user can be awarded prizes in the retailer's own currency (e.g., loyalty rewards, coupons, discounts on products/services, free merchandise, etc.). The prize information can be communicated to the third-party platform from the integrated cloud-based mobile game (e.g., via the server system 102) and maintained in the retailer's website or application for use by the user. For example, a fast-food restaurant can integrate a cloud-based mobile game into their website or application in accordance with embodiments of the present invention. The user can select and engage with the integrated cloud-based mobile game via the website or application by, for example, selecting an appropriate embedded or otherwise provided URL or other link or hyperlink to the cloud-based mobile game and then (remotely) interacting with the cloud-based mobile game. If the user wins the integrated cloud-based mobile game, the user can be awarded a free side order of a food item (or other suitable prize or offering appropriate to the retailer) that can be redeemed at the fast-food restaurant. If the user loses, the user can be allowed to compete again, offered a lesser prize, offered another chance to play, etc. The present invention can support the integration of any suitable type of cloud-based client application into any appropriate third-party platform. By allowing users to interact with a cloud-based client application integrated into and through the third party's website or application in accordance with the present invention, the third party can increase user engagement metrics with their platform without requiring users to download and install the cloud-based client application to their client devices 148.

By integrating one or more cloud-based client applications into a third party's platform, distinct experiences can be tailored for users on the third-party platform that may not be available to the general population who access a non-integrated version of the cloud-based client application or access it from a different website or application. For example, the integrated cloud-based client application on the third-party platform can provide features, functionality, interface modifications, and the like that are available to users of the integrated cloud-based client application. For instance, if the integrated cloud-based client application is a cloud-based mobile game, users interacting with the integrated cloud-based mobile game can have access to special or promotional tournaments that are not available to general users of the cloud-based mobile game. Additionally or alternatively, users interacting with the integrated cloud-based client application can be presented with special limited time offers (LTOs), advertisements, or other promotions that are not available to general users of the cloud-based client application. Additionally or alternatively, users interacting with the integrated cloud-based client application can be presented with modified or enhanced user interfaces (e.g., different screens, customizations, third-party branding information, etc.) that are not available to general users of the cloud-based client application. Other modifications to the user experience of an integrated cloud-based client application (including modifications to the graphical user interface inside and/or outside of the integrated cloud-based client application) to support the third-party platform are possible.

In some implementations of the present invention, the data collected from users interacting with the integrated cloud-based client application can also be used to additionally or alternatively tailor the user experience of the integrated cloud-based client application. In an embodiment, the features, functionality, and capabilities of the integrated cloud-based client application on the third-party platform can be targeted to individual users based on the third-party platform user data, data from or associated with the user's client device 148, and the like. For example, the server system 102 can identify the geographical location of each user, such as via the GPS of the client device 148 (e.g., passed to the session management controller 140 via the session information module 156), from account profile information of the user (e.g., retrieved from the databases 146), or the like. A user who accesses the integrated cloud-based client application from one geographical location (e.g., a first state or region) can be presented with a user experience that is different from that of a user who accesses the integrated cloud-based client application from a different geographical location (e.g., a different state or region). The different user experience can include, for example, different user interfaces, different tournaments (e.g., in the context of cloud-based mobile games), different features and functionality, and the like. For instance, if the integrated cloud-based client application is a cloud-based mobile game, the user data can be used to match players for the integrated cloud-based mobile game. For example, for a competitive, skill-based integrated cloud-based mobile game, the user information can be used to match users with other users who are interacting with the integrated cloud-based mobile game rather than with users from the general population of the (non-integrated) cloud-based mobile game. Such player matching can assist in ensuring fairness in the competitions and/or to enforce anti-fraud/anti-cheat measures, as a user of the integrated cloud-based mobile game may have access to features and functionality that are not available to the general population of users of the (non-integrated) cloud-based mobile game.

Some implementations of the present invention can be used to integrate cloud-based client applications into online or digital advertisements. For purposes of illustration and not limitation, a cloud-based mobile game can be integrated into a digital advertisement to create an interactive ad unit, such as a playable ad. In some implementations of the present invention, the integrated cloud-based mobile game can be accessed from the playable ad by having the user click on a URL, link, or hyperlink embedded or otherwise provided in the playable ad. Alternatively, the cloud-based mobile game can start automatically within the playable ad upon surfacing, presentation, or display of the playable ad to the user. A user can interact with the integrated cloud-based mobile game in and through the playable ad, for example, to win prizes, promotions, and other like rewards as part of the digital ad campaign. In an embodiment, such rewards could be used for the cloud-based mobile game itself (e.g., virtual currency or rewards) to incentivize users to interact with the playable ad. For example, users can use such rewards for making in-app purchases or for other types of redemptions or purchases within the cloud-based mobile game itself while interacting with the playable ad. In an alternative embodiment, such rewards can be used for or with another application or website associated with the digital ad campaign to drive user engagement. However, any suitable cloud-based client application can be integrated into a digital advertisement to create an interactive ad unit. For example, an interactive ad unit or other digital advertisement for a cloud-based client application product can include a trial version (or even a fully-enabled, but time-limited version) of the cloud-based client application product integrated into the interactive ad unit or other digital ad. Consequently, users can engage with and evaluate the cloud-based client application product (e.g., within and through the interactive ad unit or other digital ad) without having to wait to download and install it or otherwise purchase it before evaluation.

Figure 4:
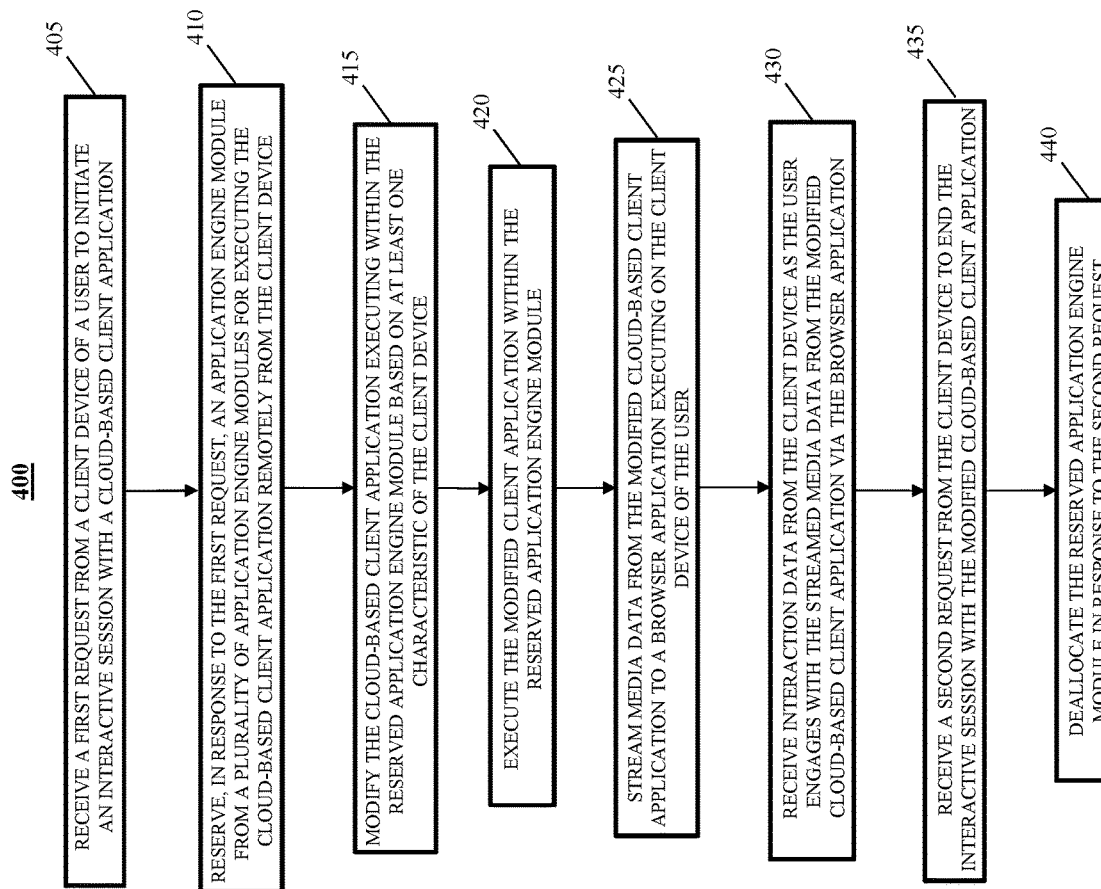
FIG. 4 is a flowchart illustrating an example method for remotely interacting with cloud-based client applications.

FIG. 4 is a flowchart illustrating an example method 400 for remotely interacting with cloud-based client applications using, for example, the server system 102 of FIG. 1, in accordance with embodiments of the disclosure. At block 405, the server system 102 can receive a first request from a client device (e.g., client device 148) of a user to initiate an interactive session with a cloud-based client application. The first request can include at least one characteristic of the client device. For purposes of illustration and not limitation, the client device characteristic can be, for example, a geographical location of the client device, although other characteristics are possible. The cloud-based client application can be configured to execute on a computing platform different and remote from the client device. For purposes of illustration and not limitation, the client device can be, for example, an Android-based smartphone, while the computing platform can be, for example, a desktop PC. At block 410, the server system 102 (e.g., via the application engine inventory and reservations module 136) can reserve, in response to the first request, an application engine module from a plurality of application engine modules (e.g., the plurality of application engine modules 106) for executing the cloud-based client application remotely from the client device. The application engine module can be bound to the user for a duration of the interactive session. In an embodiment, each application engine module can be reserved for one user such that each application engine module can be used by at most a single (bound) user during an interactive session. At block 415, the server system 102 can modify the cloud-based client application executing within the reserved application engine module based on the at least one characteristic of the client device. In an embodiment, the characteristics of the client device can be used to alter the cloud-based client application that executes in the reserved application engine module. For purposes of illustration and not limitation, if the characteristic of the client device is a geographical location, then the server system 102 can modify the cloud-based client application to present visual features (e.g., interface changes, limited time offers, advertisements, etc.) that are specific to the geographical area in which the client device is located, so that users in different geographical locations can experience cloud-based client applications that can be tailored to their particular location or other appropriate client device characteristics. At block 420, the server system 102 can execute the modified cloud-based client application within the reserved application engine module. At block 425, the server system 102 can stream media (e.g., video and/or audio) data from the modified cloud-based client application to a browser application or other suitable application (e.g., via display module 152 in browser module 150) executing on the client device of the user. At block 430, the server system 102 can receive interaction data (e.g., input, responses, feedback, etc.) from the client device (e.g., via interaction capture module 154) as the user engages with the streamed media data from the modified cloud-based client application via the browser application on the client device 148. At block 435, the server system 102 can receive a second request from the client device (e.g., via session information module 156 to session management controller 140) to end the interactive session with the modified cloud-based client application. In an embodiment, the second request can be a termination of the media stream to which the client device is connected rather than a specific request from the client device to end the interactive session. At block 440, the server system 102 can deregister or deallocate the reserved application engine module (e.g., via the application engine inventory and reservations module 136) in response to the second request. In an embodiment, the reserved application engine module can be deregistered or deallocated from inventory and the processor(s) and process(es) supporting the reserved application engine module can be spun down or otherwise terminated so that the application engine module is not reused for multiple users. In an alternative embodiment, the reserved application engine module can be unbound from the user and available for use by a second (or subsequent) user.

Figure 5:
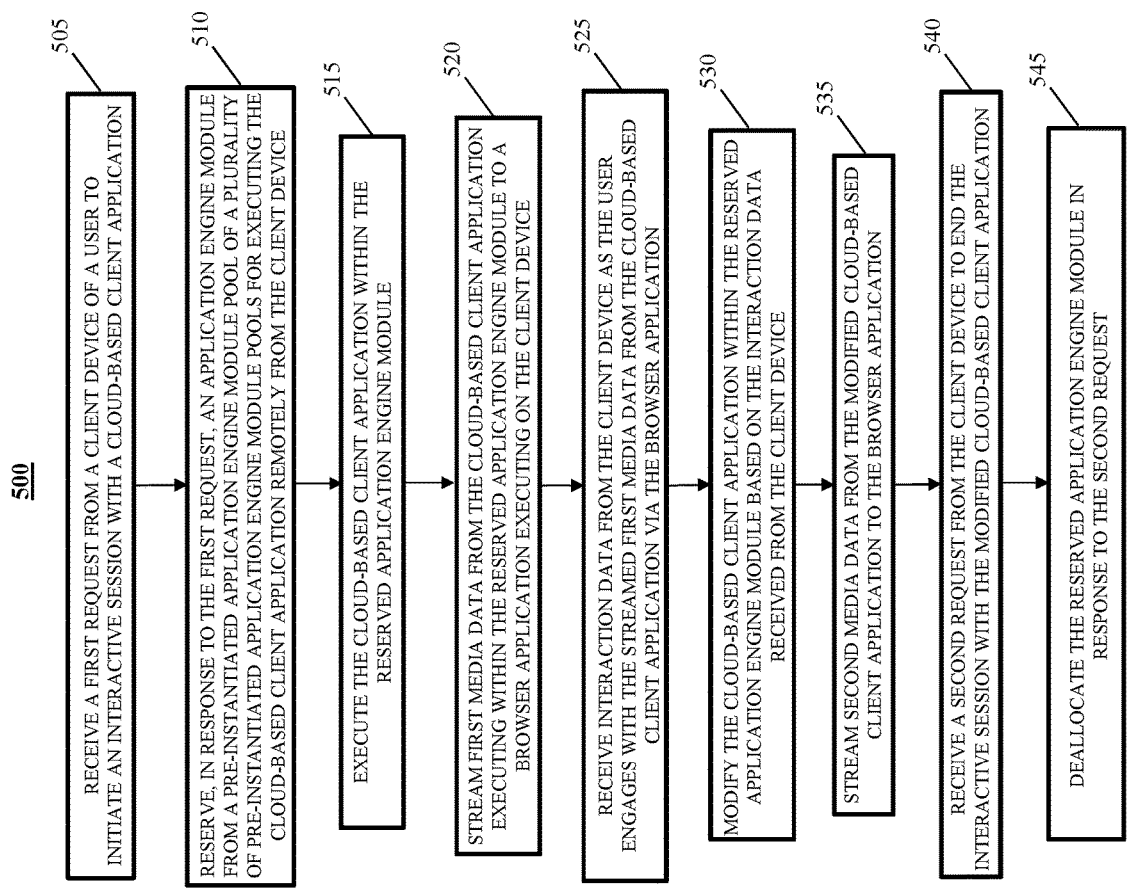
FIG. 5 is a flowchart illustrating an example method for remotely interacting with cloud-based client applications.

FIG. 5 is a flowchart illustrating an example method 500 for remotely interacting with cloud-based client applications using, for example, the server system 102 of FIG. 2 or FIG. 3, in accordance with embodiments of the disclosure. At block 505, the server system 102 can receive a first request from a client device (e.g., client device 148) of a user to initiate an interactive session with a cloud-based client application. The cloud-based client application can be configured to execute on a second client device. The second client device can comprise a computing platform different and remote from the client device. For purposes of illustration and not limitation, the client device can be, for example, an Android-based smartphone, while the second client device can be, for example, a desktop PC. At block 510, the server system 102 can reserve (e.g., via the application engine inventory and reservations module 136), in response to the first request, an application engine module from a pre-instantiated application engine module pool of a plurality of pre-instantiated application engine module pools for executing the cloud-based client application remotely from the client device. The reserved application engine module can be bound to the client device for a duration of the interactive session. A pre-instantiated application engine module can be added to the pre-instantiated application engine module pool to replace the reserved application engine module. In some implementations of the present invention, each pre-instantiated application engine module pool of the plurality of pre-instantiated application engine module pools can be associated with a different cloud-based client application. At block 515, the cloud-based client application can be executed within the reserved application engine module. At block 520, first media data can be streamed from the cloud-based client application executing within the reserved application engine module to a browser application (e.g., via display module 152 of browser module 150) executing on the client device. At block 525, interaction data can be received from the client device (e.g., via the interaction capture module 154) as the user engages with the streamed first media data from the cloud-based client application via the browser application. At block 530, the cloud-based client application can be modified within the reserved application engine module based on the interaction data received from the client device. At block 535, second media data can be streamed from the modified cloud-based client application to the browser application. At block 540, a second request can be received from the client device (e.g., via the session information module 156 to the session management controller 140) to end the interactive session with the modified cloud-based client application. At block 545, the reserved application engine module can be deallocated in response to the second request. The reserved application engine module can be unbound from the client device. A similar process can be performed for application instance modules, as illustrated and discussed with respect to FIG. 3.

Figure 6:
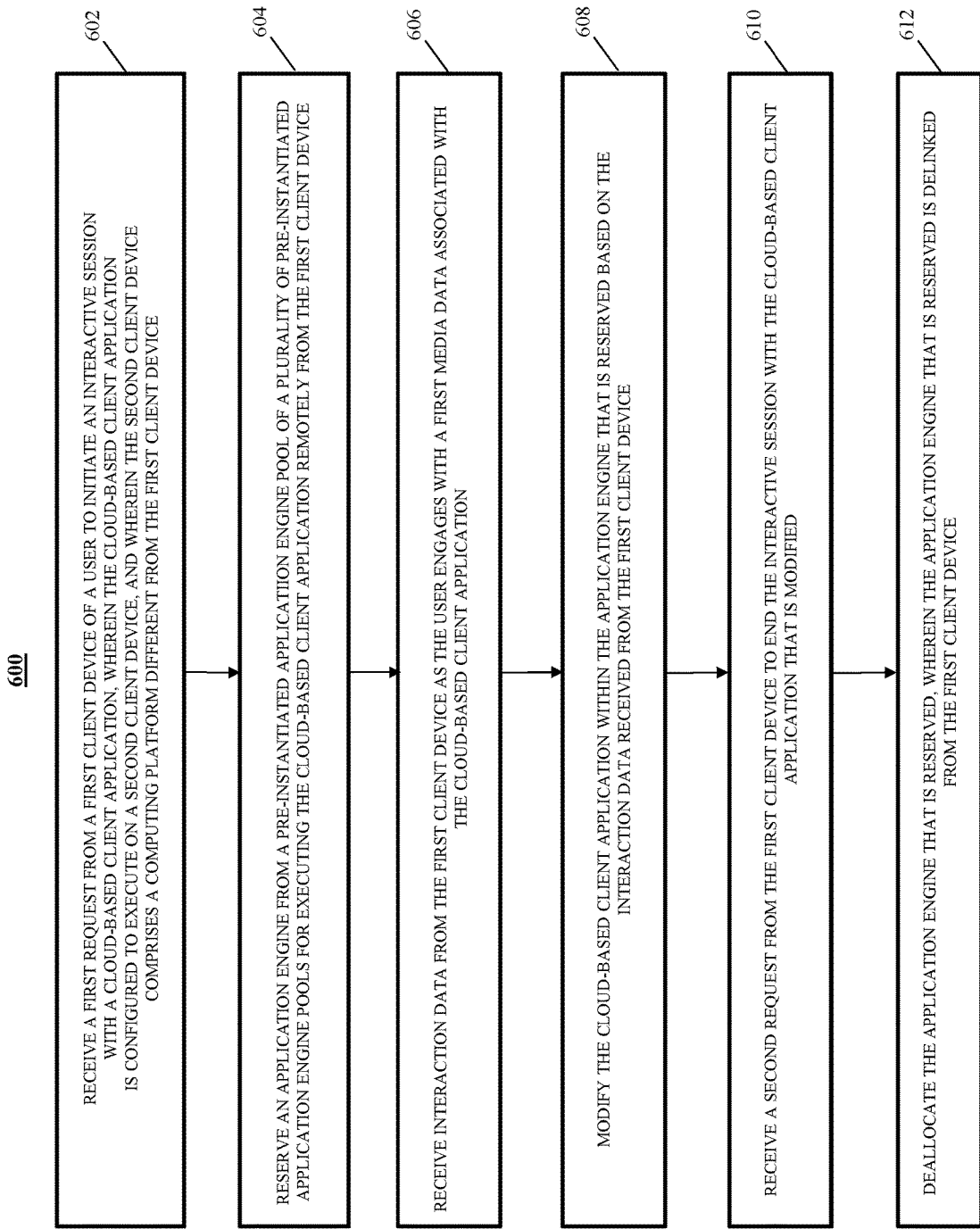
FIG. 6 is another flowchart illustrating an example method for remotely interacting with cloud-based client applications.

FIG. 6 is another flowchart illustrating an example method 600 for remotely interacting with cloud-based client applications. At block 602, a first request from a first client device of a user may be received in order to initiate an interactive session with a cloud-based client application. The cloud-based client application can be configured to execute on a second client device. It is noted that the first client device may vary from the second client device, as the second client device can comprise a computing platform that is different from the first client device. In aspects of the present invention, the first client device may be a smartphone, and the second client device may be a desktop computer. In aspects of the present invention, the cloud-based client application, as described herein, may operate on the second client device, with the media (i.e., video and/or audio) data output from the cloud-based client application streamed to and displayed on the first client device. As stated above, the first request can include a characteristic of the client device, which may correspond to, for instance, a geographical location specific to the client device. For example, the geographical location may correspond to a city, a city block, a particular address, and so forth.

At block 604, an application engine from a pre-instantiated application engine pool of a plurality of pre-instantiated application engine pools may be reserved for the purpose of executing the cloud-based client application remotely from the first client device. As described above, such a reservation operation enables the linking of the cloud-based client application executing within the application engine specifically to the first client device such that the cloud-based client application operates only in conjunction with the first client device for a predefined duration of time.

At block 606, interaction data from the first client device may be received as the user engages with a first media data associated with the cloud-based client application. For example, the interaction data may correspond to input, responses, feedback, etc. from the user as the user (remotely) engages with the cloud-based client application. The first media data can include video and/or audio data streamed from the cloud-based client application to the user on the first client device.

At block 608, the cloud-based client application executing within the application engine that is reserved may be modified based on the interaction data received from the first client device. As described above, in aspects, the modification may involve presenting, via the display module 152 of the first client device, one or more visual features that are updated as the user engages with the cloud-based client application. Additionally or alternatively, the visual features of the cloud-based client application can be modified based on or specific to the geographical area in which the first client device is located or other suitable characteristics of the first client device. For example, such visual features may correspond to advertisements or offers that are related to or somehow specific to the location of the first client device.

At block 610, a second request from the first client device may be received to end the interactive session with the cloud-based client application that is modified. For example, the user may select an icon or interact with a button on the first client device to end the interactive session with the cloud-based client application. Various ways of terminating the interactive session are contemplated.

At block 612, the application engine that is reserved may be deallocated. The application engine that is reserved may be delinked or otherwise unbound from the first client device. For example, the deallocation may involve deregistering the application engine such that the application engine is no longer linked, coupled, or otherwise bound for operation specifically with the first client device. In other words, after the deallocation, the application engine may be linked, bound or allocated to a client device that is different from the first client device.

Embodiments of the present invention can improve network efficiency by not requiring users to download and install to their client device numerous (e.g., dozens, hundreds, or more) different client applications with which they would like to interact. Instead, the present invention can improve network traffic and network bandwidth utilization, since it is the video/audio data and user input that are communicated between the server system 102 and the client device 148 rather than the entire client application itself. Additionally, the present invention can reduce computer storage requirements both on the client side and server side. For example, users would not be required to download and install any client applications on and to their client device. In some implementations of the present invention, the server system 102 can store a single version of a cloud-based client application which can be accessed from and distributed to any type of client device, instead of having to store numerous different versions of the client application to support a plethora of client devices.

Embodiments of the present invention can also improve the processing efficiency of the client devices 148, since the client devices 148 can process the video/audio data from the cloud-based client application more quickly and more efficiently than executing the entire client application itself natively on the client device. Embodiments of the present invention can also improve the processing efficiency of the server system 102. The server system 102 can allocate computing resources when an application engine module and/or application instance module is registered for an active session and deallocate those resources when the active session is completed, rather than maintaining continuous execution of and computing resources to support the cloud-based client application on the server system 102. In other words, the server system 102 can register and deregister application engine modules and/or application instances, respectively, as needed without having to continually maintain and process each cloud-based client application for each client device. Consequently, the server system 102 can more effectively allocate computer processing resources to those application engine modules (and the cloud-based client applications running in those application engine modules) and/or application instances that are being used and away from those application engine modules and/or application instances that are not. In some implementations of the present invention, the pre-warming of application engine modules in application engine module pools and/or application instances in application instance pools can also substantially reduce the response time for establishing active sessions. Consequently, embodiments of the present invention can manage users in active sessions at scale to maintain instant (or nearly instant) startup and interaction with the cloud-based client applications (e.g., "instant play" in the context of cloud-based mobile games), particularly when there are, for example, hundreds or thousands of cloud-based client applications and millions, tens of millions, or more users interacting with those cloud-based client applications concurrently.

Figure 7:
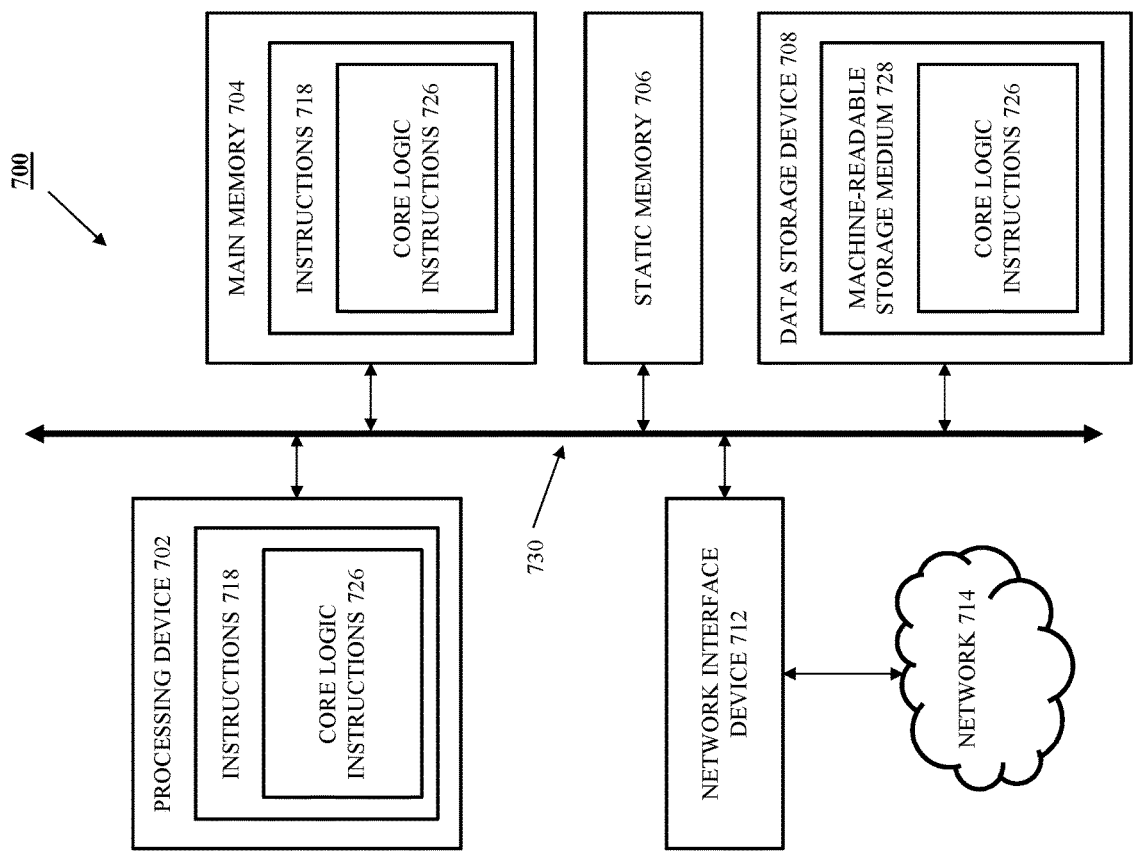
FIG. 7 is a block diagram of an example computing device that may perform one or more of the operations described herein, in accordance with the present embodiments.

FIG. 7 is a block diagram of an example computing device 700 that may perform one or more of the operations described herein, in accordance with the present embodiments. The computing device 700 may be connected to other computing devices in a LAN, an intranet, an extranet, and/or the Internet. The computing device 700 may operate in the capacity of a server machine in client-server network environment or in the capacity of a client in a peer-to-peer network environment. The computing device 700 may be provided by a personal computer (PC), a set-top box (STB), a server, a network router, switch or bridge, or any machine capable of executing a set of instructions (sequential or otherwise) that specify actions to be taken by that machine. Further, while only a single computing device 700 is illustrated, the term "computing device" shall also be taken to include any collection of computing devices that individually or jointly execute a set (or multiple sets) of instructions to perform the methods discussed herein.

The example computing device 700 may include a computer processing device 702 (e.g., a general purpose processor, ASIC, etc.), a main memory 704, a static memory 706 (e.g., flash memory or the like), and a data storage device 708, which may communicate with each other via a bus 730. The computer processing device 702 may be provided by one or more general-purpose processing devices such as a microprocessor, central processing unit, or the like. In an illustrative example, computer processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The computer processing device 702 may also comprise one or more special-purpose processing devices, such as an application specific integrated circuit (ASIC), a field programmable gate array (FPGA), a digital signal processor (DSP), network processor, or the like. The computer processing device 702 may be configured to execute the operations described herein, in accordance with one or more aspects of the present disclosure, for performing the operations and steps discussed herein.

The computing device 700 may further include a network interface device 712, which may communicate with a network 714. The data storage device 708 may include a machine-readable storage medium 728 on which may be stored one or more sets of instructions, e.g., instructions for carrying out the operations described herein, in accordance with one or more aspects of the present disclosure. Instructions 718 implementing core logic instructions 726 may also reside, completely or at least partially, within main memory 704 and/or within computer processing device 602 during execution thereof by the computing device 700, main memory 704 and computer processing device 702 also constituting computer-readable media. The instructions may further be transmitted or received over the network 714 via the network interface device 712.

While machine-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media, magnetic media, and the like.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, solid state drives, or the like. However, a computer need not have such devices. Moreover, a computer can be embedded in another device, e.g., a smart phone, a mobile audio or media player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor, a light emitting diode (LED) monitor, or the like, for displaying information to the user and a keyboard and a pointing device, e.g., a mouse, a trackball, a touchpad, a stylus, or the like, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like. In addition, a computer can interact with a user by sending resources to and receiving resources from a device that is used by the user; for example, by sending web pages to a web browser on a user's client device in response to requests received from the web browser.

Embodiments of the subject matter described in this disclosure can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), peer-to-peer networks (e.g., ad hoc peer-to-peer networks), and the like.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Reference throughout this disclosure to "one embodiment" or "an embodiment" means that a particular feature, structure, or characteristic described in connection with the embodiments included in at least one embodiment. Thus, the appearances of the phrase "in one embodiment" or "in an embodiment" in various places throughout this disclosure are not necessarily all referring to the same embodiment. In addition, the term "or" is intended to mean an inclusive "or" rather than an exclusive "or."

While this disclosure contains many specific implementation details, these should not be construed as limitations on the scope of any inventions or of what may be claimed, but rather as descriptions of features specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations and/or logic flows are depicted in the drawings and/or described herein in a particular order, this should not be understood as requiring that such operations and/or logic flows be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;"

"one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The above description of illustrated implementations of the invention is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

What is claimed is:

1. A method, comprising:
    receiving, by at least one data processor, a first request from a first client device of a user for initiating an interactive session with a cloud-based client application;
    reserving, by the at least one data processor and in response to the first request, an application engine from a pre-instantiated application engine pool of a plurality of pre-instantiated application engine pools;
    receiving, by the at least one data processor, interaction data from the first client device as the user engages with a first media data associated with the cloud-based client application;
    modifying, by the at least one data processor, the cloud-based client application executing within the application engine;
    receiving, by the at least one data processor, a second request from the first client device to end the interactive session with the cloud-based client application that is modified; and
    deallocating, by the at least one data processor and in response to the second request, the application engine that is reserved.

2. The method of claim 1, further comprising:
    streaming, by the at least one data processor, the first media data from the cloud-based client application to the first client device.

3. The method of claim 1, further comprising:
    streaming, by the at least one data processor to a browser application executing on the first client device, second media data from the cloud-based client application that is modified.

4. The method of claim 1, wherein:
    the cloud-based client application is configured to execute on a second client device, and wherein the second client device comprises a computing platform different from the first client device;
    the reserving of the application engine is for executing the cloud-based client application remotely from the first client device; and
    the application engine that is reserved is linked to the first client device for a duration of the interactive session, wherein a pre-instantiated application engine is added to the pre-instantiated application engine pool to replace the application engine that is reserved, and wherein each pre-instantiated application engine pool of the plurality of pre-instantiated application engine pools is associated with a different cloud-based client application.

5. The method of claim 1, wherein
    the cloud-based client application is reserved based on the interaction data received from the first client device;
    the application engine that is reserved is delinked from the first client device; and
    the first request includes at least one characteristic associated with the first client device.

6. The method of claim 5, wherein the at least one characteristic associated with the first client device characterizes a geographical area associated with the first client device, and wherein the modifying of the cloud-based client application further comprises:
    presenting, on the first client device, one or more visual features specific to the geographical area associated with the first client device.

7. The method of claim 6, wherein the one or more visual features specific to the geographical area associated with the first client device comprises one or more of interface changes or advertisements.

8. The method of claim 1, further comprising:
    receiving an input from the user prior to the second request from the first client device to terminate the interactive session; and
    pausing the interactive session with the cloud-based client application at a particular position responsive to the input, the pausing being different from the end to the interactive session.

9. The method of claim 8, further comprising:
    receiving an additional input for resuming the interactive session on a third client device; and
    resuming, on the third client device, the interactive session at the particular position responsive to receiving of the additional input.

10. A system, comprising:
    at least one data processor; and
    memory storing instructions, which, when executed by the at least one data processor, cause the at least one data processor to perform operations comprising:
        receiving a first request from a first client device of a user to initiate an interactive session with a cloud-based client application;
        reserving, in response to the first request, an application engine from a pre-instantiated application engine pool of a plurality of pre-instantiated application engine pools;
        receiving interaction data from the first client device as the user engages with a first media data associated with the cloud-based client application;
        modifying the cloud-based client application executing within the application engine;

receiving a second request from the first client device to end the interactive session with the cloud-based client application that is modified; and deallocating, in response to the second request, the application engine that is reserved.

11. The system of claim 10, wherein the operations further comprise:

streaming the first media data from the cloud-based client application to the first client device.

12. The system of claim 10, wherein the operations further comprise:

streaming, to a browser application executing on the first client device, second media data from the cloud-based client application that is modified.

13. The system of claim 10, wherein:

the cloud-based client application is configured to execute on a second client device, and wherein the second client device comprises a computing platform different from the first client device;

the reserving of the application engine is for executing the cloud-based client application remotely from the first client device; and the application engine that is reserved is linked to the first client device for a duration of the interactive session, wherein a pre-instantiated application engine is added to the pre-instantiated application engine pool to replace the application engine that is reserved, and wherein each pre-instantiated application engine pool of the plurality of pre-instantiated application engine pools is associated with a different cloud-based client application.

14. The system of claim 10, wherein:

the cloud-based client application is reserved based on the interaction data received from the first client device the application engine that is reserved is delinked from the first client device; and the first request includes at least one characteristic associated with the first client device.

15. The system of claim 14, wherein the at least one characteristic associated with the first client device characterizes a geographical area associated with the first client device, and wherein the operation of the modifying of the cloud-based client application further comprises:

presenting, on the first client device, one or more visual features specific to the geographical area associated with the first client device.

16. The system of claim 15, wherein the one or more visual features specific to the geographical area associated with the first client device comprises one or more of interface changes or advertisements.

17. The system of claim 10, wherein the operations further comprise:

receiving an input from the user prior to the second request from the first client device to terminate the interactive session; and pausing the interactive session with the cloud-based client application at a particular position responsive to the input, the pausing being different from the end to the interactive session.

18. The system of claim 17, wherein the operations further comprise:

receiving an additional input for resuming the interactive session on a third client device; and resuming, on the third client device, the interactive session at the particular position responsive to receiving of the additional input.

19. A non-transitory computer program product storing executable instructions, which, when executed by at least one data processor forming part of at least one computing system, implement operations comprising:

receiving a first request from a first client device of a user to initiate an interactive session with a cloud-based client application;

reserving, in response to the first request, an application engine from a pre-instantiated application engine pool;

receiving interaction data from the first client device as the user engages with a first media data associated with the cloud-based client application;

modifying the cloud-based client application executing within the application engine that is reserved based on the interaction data;

receiving a second request from the first client device to end the interactive session with the cloud-based client application that is modified; and deallocating, in response to the second request, the application engine that is reserved.

20. The non-transitory computer program product of claim 19, wherein the operations further comprise:

streaming the first media data from the cloud-based client application to the first client device.

* * * * *